United States Patent
Xue et al.

(10) Patent No.: US 12,149,987 B2
(45) Date of Patent: Nov. 19, 2024

(54) SUPER SLOT FOR NEW RADIO SIDELINK OVER MILLIMETER WAVE OPERATING FREQUENCIES

(71) Applicant: QUALCOMM Incorporated, San Diego, CA (US)

(72) Inventors: Yisheng Xue, San Diego, CA (US); Xiaoxia Zhang, San Diego, CA (US); Chih-Hao Liu, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 455 days.

(21) Appl. No.: 17/451,076

(22) Filed: Oct. 15, 2021

(65) Prior Publication Data
US 2023/0117182 A1    Apr. 20, 2023

(51) Int. Cl.
*H04W 28/26* (2009.01)
*H04L 5/00* (2006.01)

(52) U.S. Cl.
CPC .......... *H04W 28/26* (2013.01); *H04L 5/0048* (2013.01)

(58) Field of Classification Search
CPC ... H04W 28/26; H04W 24/08; H04W 72/046; H04L 5/0048; H04L 27/2607; H04L 1/1854; H04L 5/0051
See application file for complete search history.

(56) References Cited

U.S. PATENT DOCUMENTS

| 2019/0273592 | A1* | 9/2019 | Baghel | H04L 1/08 |
| 2020/0137536 | A1* | 4/2020 | Nguyen | H04L 27/2607 |
| 2020/0221423 | A1* | 7/2020 | Wang | H04W 72/02 |
| 2021/0099975 | A1* | 4/2021 | Wu | H04L 1/1819 |

(Continued)

FOREIGN PATENT DOCUMENTS

| CN | 113498021 A | * 10/2021 | ............ H04W 24/08 |
| CN | 115462147 A | * 12/2022 | ............... H04L 5/00 |

(Continued)

OTHER PUBLICATIONS

3GPP NR Sidelink Transmissions Toward 5G V2X, Shao, Dec. 12, 2017 (Year: 2017).*

*Primary Examiner* — Ayaz R Sheikh
*Assistant Examiner* — Louis Samara
(74) *Attorney, Agent, or Firm* — Norton Rose Fulbright US LLP

(57) ABSTRACT

This disclosure provides systems, methods, and devices for wireless communication that support a super slot configuration for new radio (NR) sidelink over millimeter wave (mmW) operating frequencies. In a first aspect, a method of wireless communication by a user equipment (UE) includes obtaining a sidelink resource pool configuration including configuration of one or more super slots, wherein each super slot includes a plurality of slots contiguous in a time domain The UE may select one or more sidelink resource slots for sidelink transmissions in a sidelink resource pool and transmit an enhanced sidelink control information (eSCI) message in a first slot of a first super slot, wherein the eSCI (Continued)

message indicates a reservation of slots corresponding to the one or more sidelink resource slots. The UE may then send the sidelink transmissions on at least one slot of the reserved slots. Other aspects and features are also claimed and described.

30 Claims, 15 Drawing Sheets

(56) References Cited

U.S. PATENT DOCUMENTS

| | | | |
|---|---|---|---|
| 2022/0159624 A1* | 5/2022 | Ko | H04L 1/1812 |
| 2023/0129257 A1* | 4/2023 | Xia | H04L 5/0051 |
| | | | 370/329 |

FOREIGN PATENT DOCUMENTS

| | | | | | |
|---|---|---|---|---|---|
| CN | 116349371 A | * | 6/2023 | | |
| CN | 116848916 A | * | 10/2023 | ........... | H04B 17/345 |
| CN | 116848926 A | * | 10/2023 | ........... | H04B 7/0626 |
| WO | WO-2022078245 A1 | * | 4/2022 | | |

* cited by examiner

SUPER SLOT FOR NEW RADIO SIDELINK OVER MILLIMETER WAVE OPERATING FREQUENCIES

TECHNICAL FIELD

Aspects of the present disclosure relate generally to wireless communication systems, and more particularly, to new radio (NR) sidelink operations. Some features may enable and provide a super slot configuration for NR sidelink over millimeter wave (mmW) operating frequencies.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes obtaining, by the UE, a sidelink resource pool configuration including configuration of one or more super slots, wherein each super slot of the one or more super slots includes a plurality of slots contiguous in a time domain, selecting, by the UE, one or more sidelink resource slots for sidelink transmissions in a sidelink resource pool, transmitting, by the UE, an enhanced sidelink control information (eSCI) message in a first slot of a first super slot of the one or more super slots identified by the UE for the sidelink transmissions, wherein the eSCI message indicates a reservation of slots corresponding to the one or more sidelink resource slots, and sending, by the UE, the sidelink transmissions on at least one slot of the reservation of slots.

In an additional aspect of the disclosure, an apparatus configured for wireless communication is disclosed. The apparatus includes at least one processor, and a memory coupled to the at least one processor. The at least one processor is configured to obtain, by the UE, a sidelink resource pool configuration including configuration of one or more super slots, wherein each super slot of the one or more super slots includes a plurality of slots contiguous in a time domain, to select, by the UE, one or more sidelink resource slots for sidelink transmissions in a sidelink resource pool, to transmit, by the UE, an eSCI message in a first slot of a first super slot of the one or more super slots identified by the UE for the sidelink transmissions, wherein the eSCI message indicates a reservation of slots corresponding to the one or more sidelink resource slots, and to send, by the UE, the sidelink transmissions on at least one slot of the reservation of slots.

In an additional aspect of the disclosure, an apparatus configured for wireless communication is disclosed. The apparatus includes means for obtaining, by the UE, a sidelink resource pool configuration including configuration of one or more super slots, wherein each super slot of the one or more super slots includes a plurality of slots contiguous in a time domain, means for selecting, by the UE, one or more sidelink resource slots for sidelink transmissions in a sidelink resource pool, means for transmitting, by the UE, an eSCI message in a first slot of a first super slot of the one or more super slots identified by the UE for the sidelink transmissions, wherein the eSCI message indicates a reservation of slots corresponding to the one or more sidelink resource slots, and means for sending, by the UE, the sidelink transmissions on at least one slot of the reservation of slots.

In an additional aspect of the disclosure, a non-transitory computer-readable medium stores instructions that, when executed by a processor, cause the processor to perform operations including obtaining, by the UE, a sidelink resource pool configuration including configuration of one or more super slots, wherein each super slot of the one or more super slots includes a plurality of slots contiguous in a time domain, selecting, by the UE, one or more sidelink resource slots for sidelink transmissions in a sidelink resource pool, transmitting, by the UE, an enhanced sidelink control information (eSCI) message in a first slot of a first super slot of the one or more super slots identified by the UE for the sidelink transmissions, wherein the eSCI message indicates a reservation of slots corresponding to the one or more sidelink resource slots, and sending, by the UE, the sidelink transmissions on at least one slot of the reservation of slots.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
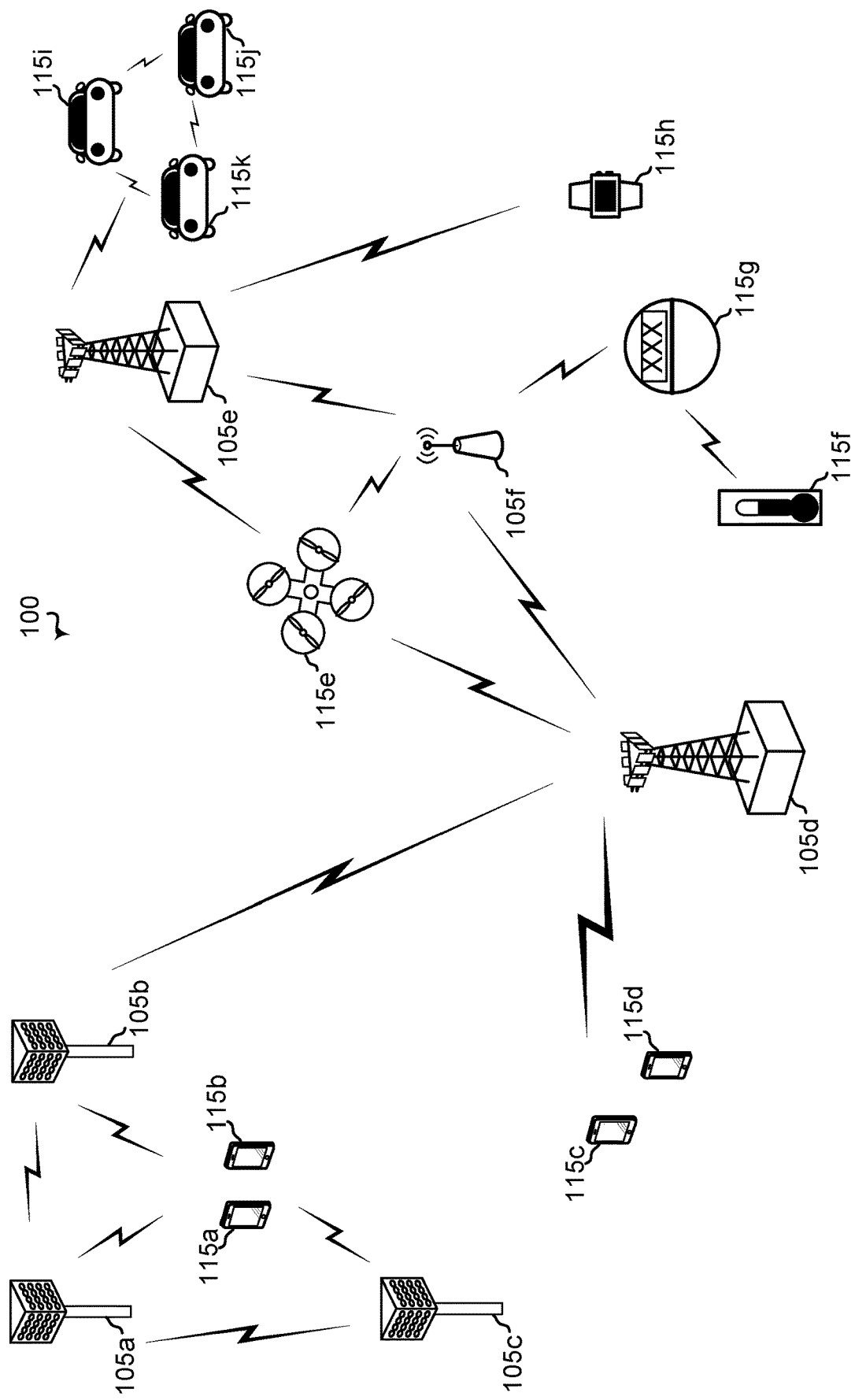
FIG. 1 is a block diagram illustrating example details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support a super slot configuration for new radio (NR) sidelink over millimeter wave (mmW) operating frequencies according to one or more aspects of the present disclosure. Particular implementations of the subject matter described in this disclosure may be implemented to realize one or more of the following potential advantages or benefits. In some aspects, the present disclosure provides techniques for adaptive reduction of a default sensing window length for super slot configuration for NR sidelink over mmW operating frequencies. The super slot configuration allowing for intra- and inter-super slot reservation may accommodate the shorted absolute time for OFDM symbol and slots at larger SCS. The super slot configurations may further reduce or minimize the blind decoding performed by sensing or RX UEs. Providing for an eSCI message per super slot may also provide more availability for eSCI opportunities to other UEs.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to as (interchangeably) as a "sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "mmW" band.

The frequencies between FR1 and FR2 are often referred to as mid-band frequencies. Recent 5G NR studies have identified an operating band for these mid-band frequencies as frequency range designation FR3 (7.126 GHz-24.25 GHz). Frequency bands falling within FR3 may inherit FR1 characteristics and/or FR2 characteristics, and, thus, may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2x/FR2-2 (52.6 GHz-71 GHz), FR4 (71 GHz-114.25 GHz), and FR5 (114.25 GHz-275 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmW" or the like if used herein may broadly represent frequencies that may include mid-band frequencies, may be within FR2, FR2x/FR2-2, FR4, and/or FR5, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmW transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmW components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, or backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
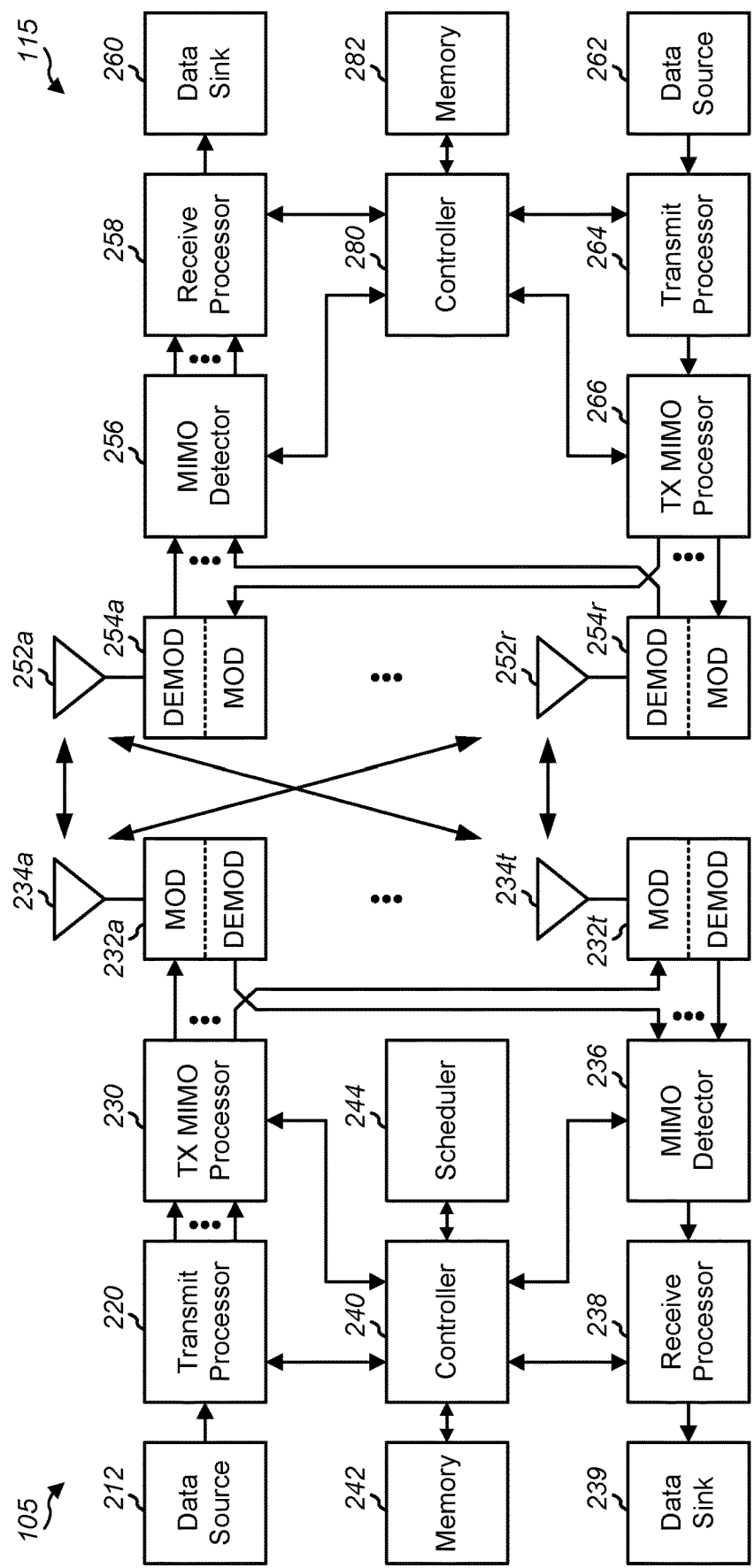
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIG. 4, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, a 16-µs, or a 25-µs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Sensing for shared channel access may also be categorized into either full-blown or abbreviated types of LBT procedures. For example, a full LBT procedure, such as a CAT 3 or CAT 4 LBT procedure, including extended channel clearance assessment (ECCA) over a non-trivial number of 9-μs slots, may also be referred to as a "Type 1 LBT." An abbreviated LBT procedure, such as a CAT 2 LBT procedure, which may include a one-shot CCA for 16-μs or 25-μs, may also be referred to as a "Type 2 LBT."

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

The 3GPP Release 16 (Rel-16) standards have provided for various use cases of new radio (NR) sidelink (SL) operations, such as for the vehicle-to-everything (V2X) use case. The network may configure sets of resources available for UE sidelink communications. Each such transmission resource pool may be linked to one of the two channel access modes. In a first access mode (Mode 1), for in-coverage deployment, SL UEs may receive grants from serving base stations for channel access to resources within the transmission resource pools. In-coverage generally refers to an SL UE detecting at least one cell on the frequency on which it is configured to perform NR sidelink communications that measures to be suitable for communications. Where no suitable cell is detected on this configured frequency, the SL UE is considered to be out-of-coverage. In a second access mode (Mode 2), for out-of-coverage deployment, SL UEs may use autonomous sensing for channel access.

Figure 3:
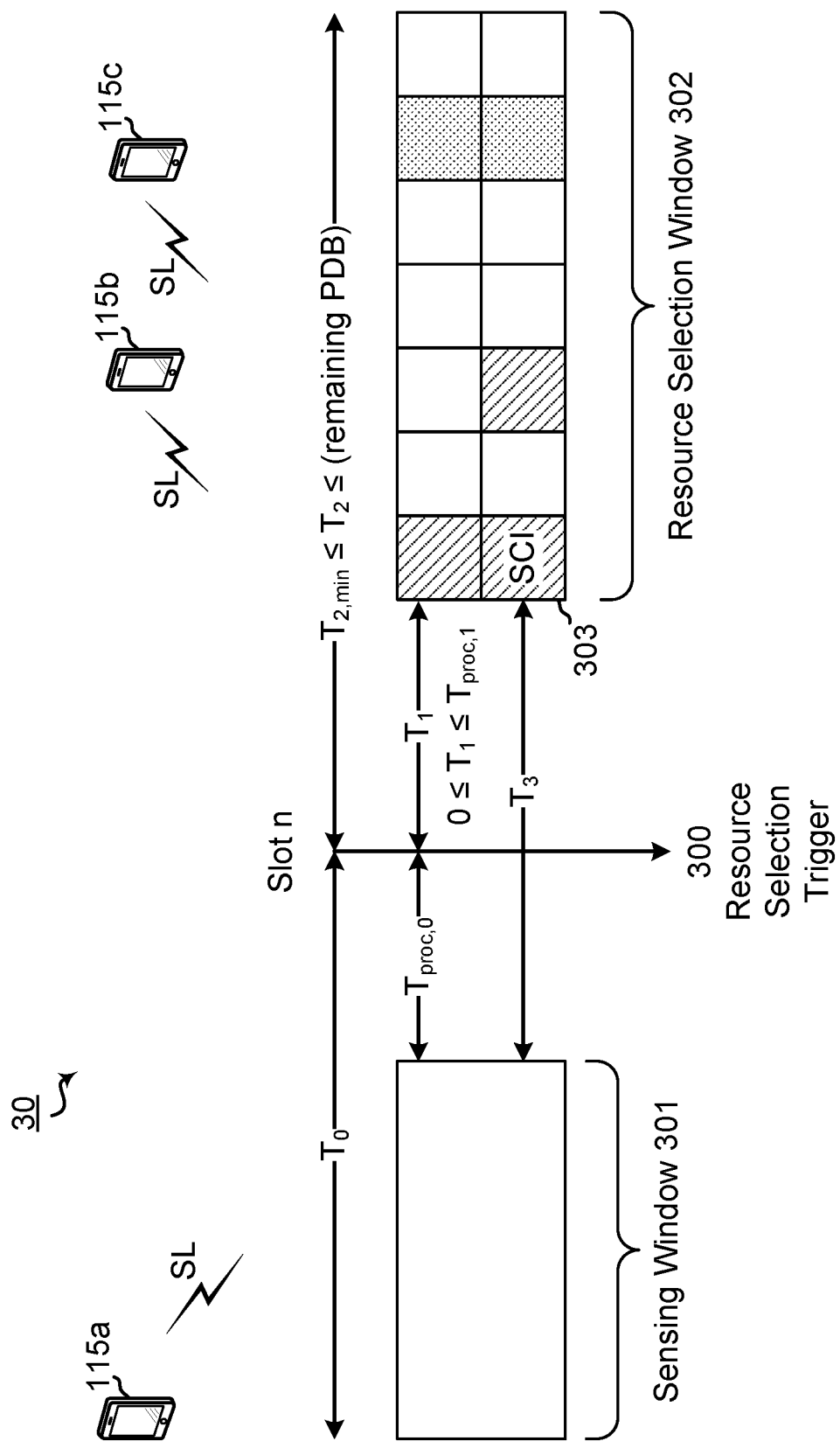
FIG. 3 is a block diagram illustrating an example NR network configured for sidelink communications over unlicensed spectrum between any one or more of UEs operating in the Mode 2 access mode.

FIG. 3 is a block diagram illustrating an example NR network configured for sidelink communications over unlicensed spectrum between any one or more of UEs operating in the Mode 2 access mode. An available set of resources for sidelink communications is identified at slot n. With identification of such resources of slot n, a sidelink transmitting (TX) UE, such as UE 115a, may define sensing window 301 prior to resource selection trigger 300, and resource selection window 302 after resource selection trigger 300. When a resource selection is triggered at slot n, resource selection trigger 300, UE 115a physical (PHY) layer may examine the shared spectrum during sensing window 301 to identify the set of candidate resources in resource selection window 302 and reports to the medium access control (MAC) layer of UE 115a. Specifically, $T_1$ is a UE implementation value being not larger than $T_{proc,1}$ represents the processing time for UE 115a for any detected signals during sensing window 301 and preparation for transmission in one or more of the selected sidelink candidate resources of resource selection window 302. Among the candidate resources reported by the PHY layer of UE 115a, the MAC layer of UE 115a would then randomly select one or more of the candidate resource blocks of resource selection window 302 for transmission.

It should be noted that the PHY layer of UE 115a may read COT-sharing indications sent by other SL UEs and report to the MAC layer which resources can be accessed with a Type 2 LBT.

It should further be noted that where the intended sidelink communications with reservation for hybrid automatic receipt request (HARM) retransmission, the sidelink transmission resources for multiple shared channel transmissions (e.g., PSSCHs) for the same transport block (TB) may be randomly selected by the MAC layer of UE 115a as well.

In addition, an NR sidelink TX UE, such as UE 115a, with 5G NR operations in Mode 2 would continuously sense channel up to $T_3$ before the actual TX selected (referred to as "last-minute re-evaluation"). The MAC layer of UE 115a may request the PHY layer to update available resources at this instant to double check whether the coming resource, as well as other reservations in the future, are still available. The PHY layer of UE 115a responds to the MAC layer regarding all available resources at this instant and, if the resource for the coming PSSCH is not available anymore, UE 115a sets the re-selection flag to the MAC layer. After receiving this flag, the MAC layer of UE 115a will randomly re-select a resource from available candidate resource sets of resource selection window 302. This may lead to a new $T_3$ based the re-evaluation. Otherwise, the PHY layer of UE 115a may expect to transmit over the pre-selected sidelink resource.

For the selected sidelink resources, each channel access may include coupled control channel transmissions (e.g., PSCCH) and shared channel transmissions (e.g., PSSCH) in the same slot. UE 115a may transmit a sidelink control information (SCI) message 303 in the first selected resource slot. SCI message 303 may represent a two-stage SCI message. The first stage SCI message (SCI-1) may be carried in the PSCCH transmission, indicating resource occupancy/reservation and parameters (e.g., demodulation reference signal (DMRS), antenna ports, modulation and coding scheme (MCS), etc.) for decoding the PSSCH. To ease the number of blind decoding attempts, UE 115a may transmits PSCCH using a pre-configured MCS and over a pre-defined set of resource elements (REs), such as with a fixed packet size.

The second stage SCI message (SCI-2) may be carried in the shared channel transmission (e.g., PSSCH) along with the data payload. The SCI-2 message may carry a layer 1 source identifier (ID), a layer 1 destination ID, a request for hybrid automatic repeat request (HARQ) response, a request for sidelink channel state information (SL-CSI), and the like. Receiver UEs (RX UEs), such as UEs 115b and 115c, may decode the SCI-2 message to identify whether they are the intended receiver. If so, the RX UEs will proceed to decode the data payload and respond, as requested, by the transmitter UE (TX UE), UE 115a. The intended RX UE may then send a HARQ response over the sidelink feedback channel (e.g., PSFCH), which may be multiplexed (e.g., TDM) with the coupled control and shared channel transmissions (e.g., PSCCH/PSSCH).

While initially developed for application to V2X use cases. However, since the standards have been developed in 3GPP Release 17 (Rel-17), NR sidelink operations have been suggested for use in other vertical domains. In order to address power limitations in battery-powered UEs, discontinuous reception (DRX) and partial sensing have been suggested to reduce power consumption. Additionally, inter-UE coordination has also been discussed to improve reliability in Mode 2 access scenarios. Most recommendations for extending NR sidelink operations has been limited to sub-6 GHz bands. However, not each new vertical domain may have access to sub-6 GHz band operations. There may be more readily available bandwidth for sidelink communication deployments within the 6 GHz and 60 GHz unlicensed bands. Additionally, there may be rate/reliability intensive applications for some vertical domains envisioned for NR SL operations, e.g., extended reality (XR) application. It can be challenging to support a >400 Mbps data rate or/and acceptable reliability using currently available sub-6 GHz spectrum.

Potential NR SL operations using the 60 GHz unlicensed band has received considerable attention due to its potential support of abundant GHz data links. Rel-17 has specified potential air interface (e.g., Uu interface) operations over this band (known as FR2x or FR2-2) which may open this band for NR SL operations. However, deployment therein will include substantial optimizations. As noted above with respect to FIG. 3, legacy PSCCH and PSSCH may be transmitted in the same slot, where PSSCH would typically be transmitted on a higher quality channel (e.g., a much higher SINR). At mmW operating frequencies, this high channel quality would exist using a narrow beam pair.

Concerns due to Doppler and phase noise impact in the higher mmW frequency bands may motivate consideration of larger subcarrier spacing (SCS). Currently, up to 960 kHz SCS are being considered for use within FR2x/FR2-2 frequencies in Rel-17. Larger SCS may lead to a shortened absolute time for the OFDM symbol and slot. Larger SCS may, thus, result in multiplied processing time in a number of slots. It may not be feasible to perform the desired dynamic beam switching when the SCI and PSSCH are transmitted in the same slot.

For example, a task that could be completed in a single slot with a 120 kHz SCS would likely correspond to multiple (e.g., 6, 8, etc.) slots with a 960 kHz SCS. Its impact on the predetermined time duration for switching beam directions (e.g., timeDurationForQCL parameter) has been reviewed and discussed for applications in the FR2x/FR2-2 frequencies. The predetermined time duration for switching beam direction addresses the minimum time duration between the end of the last symbol of the downlink control channel (e.g., PDCCH) containing a scheduling downlink control information (DCI) message to the beginning of the first symbol of the scheduled downlink shared channel transmission (e.g., PDSCH) for applying spatial quasi-colocation (QCL) information, such as to perform a receive (RX) beam switch, when the DCI message is configured with a transmission configuration indication (TCI) state index field. A UE may obtain the spatial QCL information via the TCI state indicated by the scheduling DCI message. For a 120 kHz SCS in the FR2 band, a 3GPP Release 15 (Rel-15) enabled UE may indicate its capability of 1 or 2 slots for the predetermined time duration for switching beam directions. Discussions regarding Rel-17 standards have suggested an upper bound given by the FR2 band values and scaled by 4 or 8, depending on whether the SCS is set to 480 kHz or 960 kHz. As a consequence, the scheduling of cross-slot dynamic transmit beams may be used for NR sidelink operations over FR2x/FR2-2 frequencies.

With the shortened OFDM symbol durations associated with the larger SCSs, the amount of time for a UE to perform blind decoding can become quite challenging. This issue has prompted discussions on multi-slot PDCCH monitoring. Conceptually, a UE can be configured to monitor for PSCCH every few slots (e.g., 2, 4, 6, and the like) and each DCI message can schedule up to a similar number (e.g., 2, 4, 6, and the like) PDSCHs.

In response to the challenges indicated for NR sidelink operations in mmW operating frequencies, various aspects of the present disclosure are directed to defining a super slot configuration that includes multiple slots contiguous in the time domain following a single enhanced SCI (eSCI) message, instead of one SCI message per slot as in legacy operations. Any UE, for either reception or sensing, may perform blind eSCI decoding per super-slot. Within a super-slot, any slot may include an automatic gain control (AGC) symbol, a gap symbol, and an independent control field, such as source/destination IDs and MCS, to accommodate a slot-wise independent TX/RX as in legacy NR sidelink operations.

A TX UE can send an eSCI message with a cross-super slot reservation indicating different transmit beams and transmit therein to meet the predetermined time duration for beam direction switching. An eSCI message can schedule sidelink transmission in the same super-slot using transmit beam(s) that do not implicate the predetermined time duration for beam direction switching. After a cross-super slot reservation, the TX UE can transmit at a slot without occupying the eSCI message opportunity of that particular super slot, which may leave the eSCI opportunity to another UE.

Figure 4:
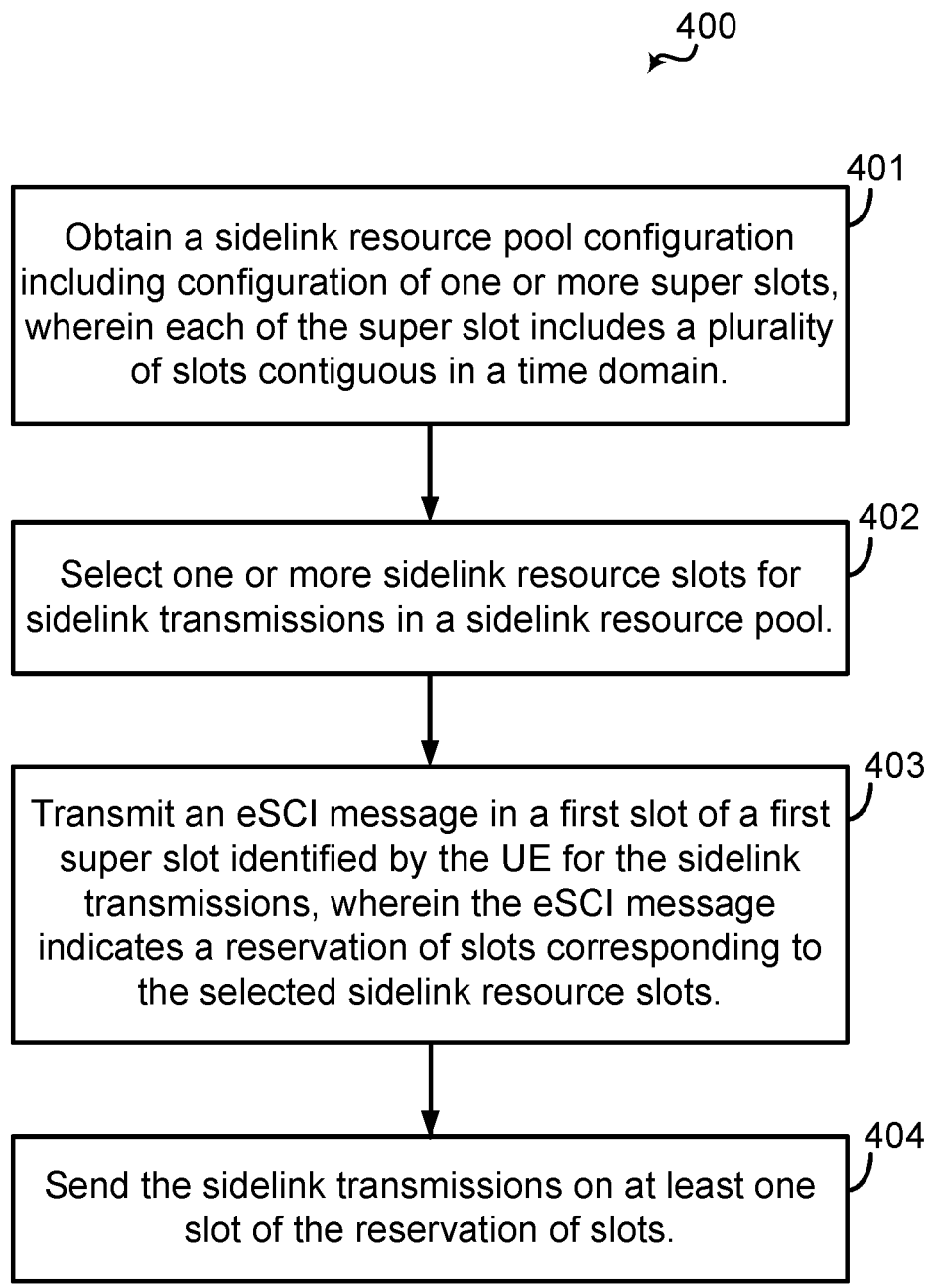
FIG. 4 is a block diagram illustrated example blocks of a process executed by a UE to provide super slot configuration for NR sidelink over mmW operating frequencies according to one or more aspects of the present disclosure.

FIG. 4 is a block diagram illustrated example blocks of process 400 executed by a UE to provide super slot configuration for NR sidelink over mmW operating frequencies according to one or more aspects of the present disclosure. Operations of process 400 may be performed by a UE, such as UE 115 or 115a described above with reference to FIG. 1-3, or 16. For example, example operations (also referred to as "blocks") of process 400 may enable UE 115/115a to support the super slot configuration for NR sidelink over mmW operating frequencies. The blocks of process 400 will also be described with respect to operations and functionality of UE 115, as described in FIG. 16.

Figure 16:
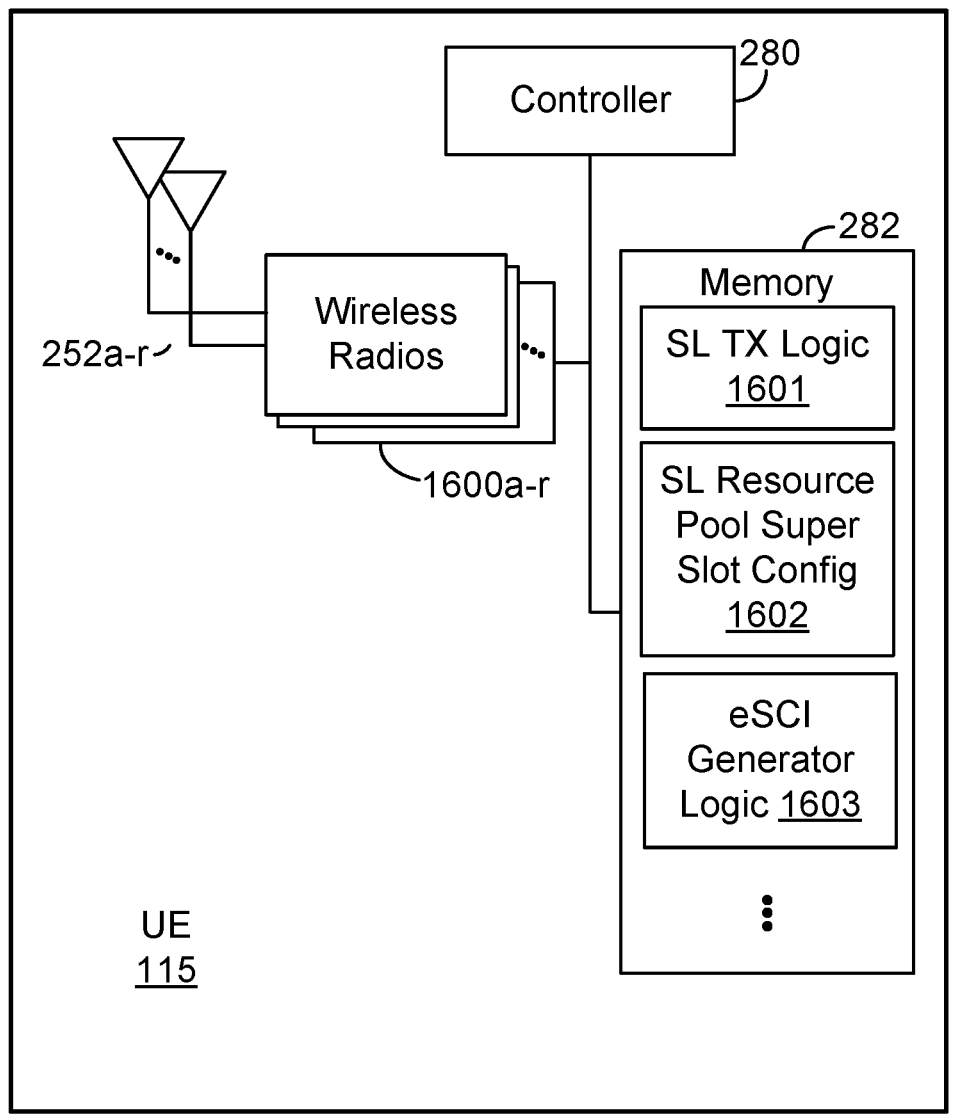
FIG. 16 is a block diagram of an example UE that supports super slot configuration for NR sidelink over mmW operating frequencies according to one or more aspects.

FIG. 16 is a block diagram of an example UE 115 that supports enhanced beam management using XR perception data according to one or more aspects. In some implementations, UE 115 includes the structure, hardware, and components shown and described with reference to UE 115 of FIGS. 1-2. For example, UE 115 includes controller 280, which operates to execute logic or computer instructions stored in memory 282, as well as controlling the components of UE 115 that provide the features and functionality of UE 115. UE 115, under control of controller 280, transmits and receives signals via wireless radios 1600a-r and antennas 252a-r. Wireless radios 1600a-r include various components and hardware, as illustrated in FIG. 2 for UE 115, including modulator and demodulators 254a-r, MIMO detector 256, receive processor 258, transmit processor 264, and TX MIMO processor 266.

As shown, memory 282 may include sidelink transmission (TX) logic 1601, sidelink resource pool super slot configuration 1602, and eSCI generator logic 1603. Sidelink TX logic 1601 may be configured to provide UE 115 with the capability and functionality for performing sidelink communications, whether transmitting or receiving such sideline communications. Sidelink resource pool super slot configuration 1602 may be configured to all UE 115 to configure the sidelink resource pool according to super slots, wherein each super slot include multiple slots contiguous in the time domain. eSCI generator logic 1603 may be configured to provide UE 115 with the functionality to generate an eSCI message for identifying a reservation of slots within a super slot. UE 115 may receive signals from or transmit signals to one or more network entities, such as UEs 115b and 115c of FIGS. 1, 3, and 5-16, via antennas 252a-r and wireless radios 1600a-r.

At block 401, a UE may obtain a sidelink resource pool configuration including configuration of one or more super slots, wherein each super slot of the one or more super slots includes a plurality of slots contiguous in a time domain. A UE, such UE 115 may execute, under control of controller 280, sidelink TX logic 1601, stored in memory 282. The features and functionality implemented by execution of the code and instructions (referred to herein as the "execution environment") of sidelink TX logic 1601 provides UE 115 the capability for obtaining access to sidelink resources for sidelink transmissions. UE 115, within the execution environment of sidelink TX logic 1601, accesses the configuration information in memory 282 at sidelink resource pool super slot configuration 1602. Sidelink resource pool super slot configuration 1602 identifies the configuration of each super slot designated in the sidelink resource pool with multiple slots that are contiguous in the time domain.

At block 402, the UE selects one or more sidelink resource slots for sidelink transmissions in a sidelink resource pool. After sensing the shared communication channel in the sensing window, a UE, such as UE 115 may select one or more of the sidelink resource slots in one or more of the super slots configured in the resource pool for sidelink transmissions.

At block 403, the UE transmits an eSCI message in a first slot of a first super slot of the one or more super slots identified by the UE for the sidelink transmissions, wherein the eSCI message indicates a reservation of slots corresponding to the one or more sidelink resource slots. One the slots have been selected, UE 115, under control of controller 280, executes eSCI generator logic 1603, stored in memory 282. The execution environment of eSCI generator logic 1603 provides UE 115 the functionality to generate an eSCI message, which indicates the reservation of slots in one or more of the super slots corresponding to the selected slots. UE 115 may then transmit the eSCI message via wireless radios 1600a-r and antennas 252a-r.

At block 404, the UE sends the sidelink transmissions on at least one slot of the reservation of slots. After transmitting the eSCI message, UE 115 may transmit the sidelink transmissions in at least one or more of the slots indicated as reserved in the eSCI. Such sidelink transmissions may be transmitted via wireless radios 1600a-r and antennas 252a-r.

In some aspects, the present disclosure provides a super slot configuration for NR sidelink over mmW operating frequencies. The super slot configuration allowing for intra- and inter-super slot reservation may accommodate the shorted absolute time for OFDM symbol and slots at larger SCS. The super slot configurations may further reduce or minimize the blind decoding performed by sensing or RX UEs. Providing for an eSCI message per super slot may also provide more availability for eSCI opportunities to other UEs.

Figure 5:
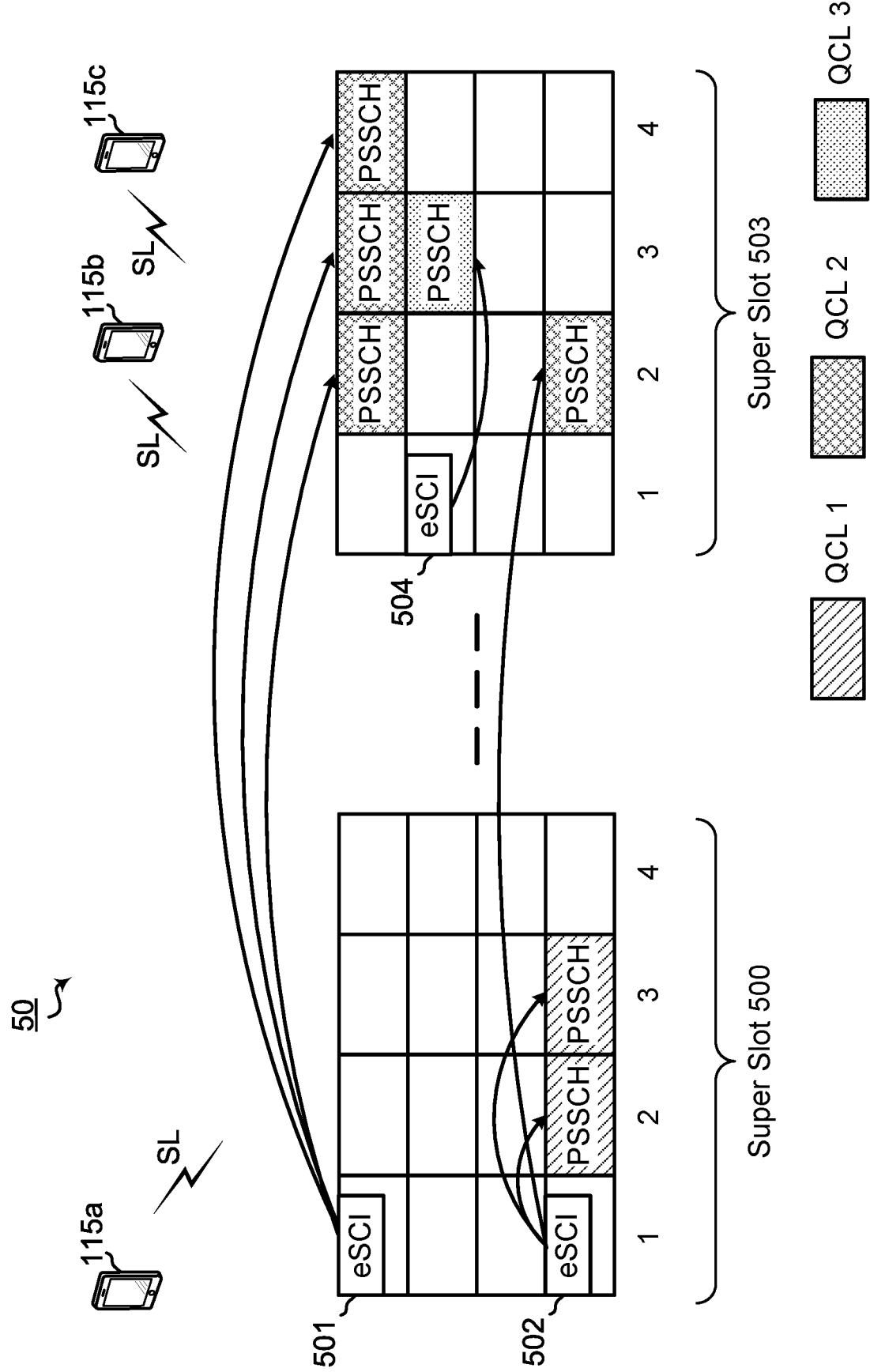
FIG. 5 is a block diagram illustrating a UE within a wireless network configured to provide super slot configuration for NR sidelink over mmW operating frequencies according to one or more aspects of the present disclosure.

FIG. 5 is a block diagram illustrating a UE 115a within a wireless network 50 configured to provide super slot configuration for NR sidelink over mmW operating frequencies according to one or more aspects of the present disclosure. UE 115a may conduct sidelink transmissions to various network entities, such as UEs 115b and 115c. According to the aspects described herein, when operating in a mmW band with a larger defined SCS (e.g., 480 kHz, 960 kHz, etc.) a sidelink TX UE, such as UE 115a, may operate with a sidelink resource pool configured with super slots for resource allocation.

A super slot, such as super slots 500 and 503, includes m>1 slots that are contiguous in the time domain. UE 115a may transmit a single enhanced SCI (eSCI), eSCIs 501, 502, and 503, per super-slot in the first/leading slot. A sensing or receiving UE, such as UEs 115b and 115c, may perform blind decoding of eSCIs 501, 502, and 504 in super slots 500 and 503. For example, eSCI 501 of super slot 500 may reserve a set of slots (slots 2-4) of a subsequent super slots, such as super slot 503. eSCI 502 of super slot 500 may indicate occupancy of slots 2 and 3 of the current slot and reserve one or more additional slots, such as slot 2, of a subsequent super slot, such as super slot 503. eSCI 504 of super slot 503 may indicate the occupancy of slot 3 of the super slot 503. Each of the occupied or reserved slots may be associated with a particular beam direction. The quasi-colocation (QCL) information identifies the particular beam direction of the beam pair associated with the sidelink transmission. Thus, QCL 1-3 identify three different beam directions associated with the selected sidelink transmission resources.

It should be noted that each slot included in a super-slot, such as slots 1-4 of super slots 500 and 503, may have an AGC symbol, a gap symbol, corresponding source/destination IDs, MCS, and the like, to accommodate different transmissions at respective slots as per legacy sidelink transmission operations. Feedback channel resources (e.g., PSFCH) can also be arranged according to the legacy sidelink transmission operation, such as via intra-slot multiplexing (e.g., TDM) between PSCCH/PSSCH and PSFCH.

Figure 6:
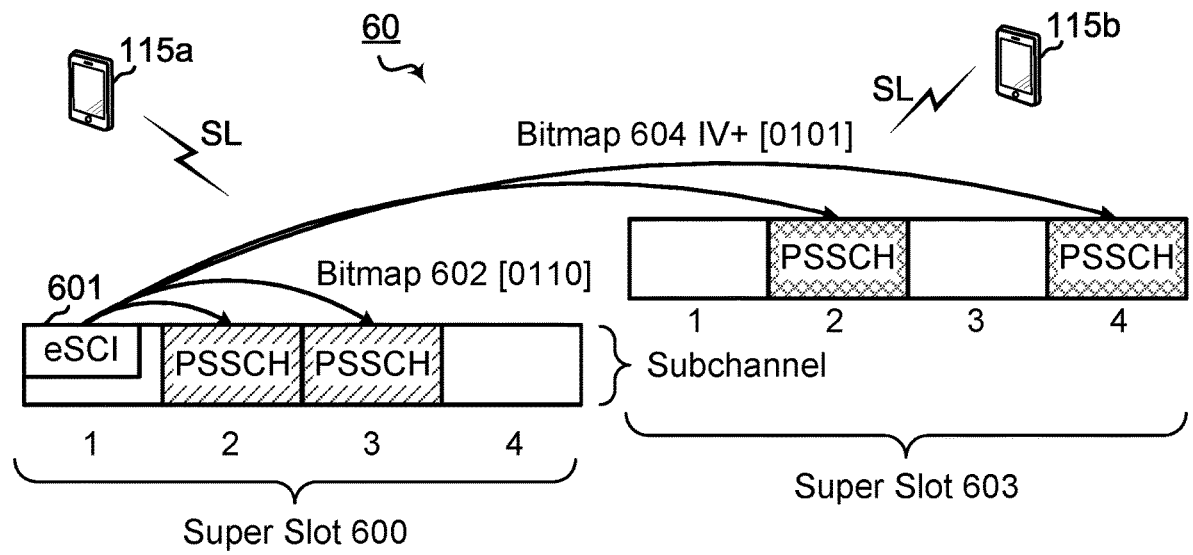
FIG. 6 is a block diagram illustrating a UE within a wireless network configured to provide super slot configuration for NR sidelink over mmW operating frequencies according to one or more aspects of the present disclosure.

FIG. 6 is a block diagram illustrating a UE 115a within a wireless network 60 configured to provide super slot configuration for NR sidelink over mmW operating frequencies according to one or more aspects of the present disclosure. As illustrated in FIG. 5, UE 115a may conduct sidelink transmissions to various network entities, such as UE 115b. According to the aspects described herein, UE 115a, may operate with a sidelink resource pool configured with super slots of multiple contiguous slots for resource allocation.

UE 115a may transmit eSCI 601 in slot 1 of super slot 600, which identifies the occupancy of slots 2 and 3 of super slot 600 at a first QCL and reservation of slots 2 and 4 of a subsequent super slot, such as super slot 603. eSCI 601 may indicate occupancy of slots 2 and 3 in super-slot 600 and reserve slots 2 and 4 of super slot 603 by using an m-length bitmap, bitmaps 602 and 604. For the cross-super slot reservations (the reservations of slots 2 and 4 of super slot 603), UE 115a can encode bitmap 604 using a two-level indication. As illustrated, UE 115a may use a super slot-level, time-frequency initialization vector (IV)-based encoding to reserve slots in multiple future super-slots. Thus, according to the illustrated aspect, a super slot is used as the time-domain granularity in the IV-based encoding for reservation.

Figure 7:
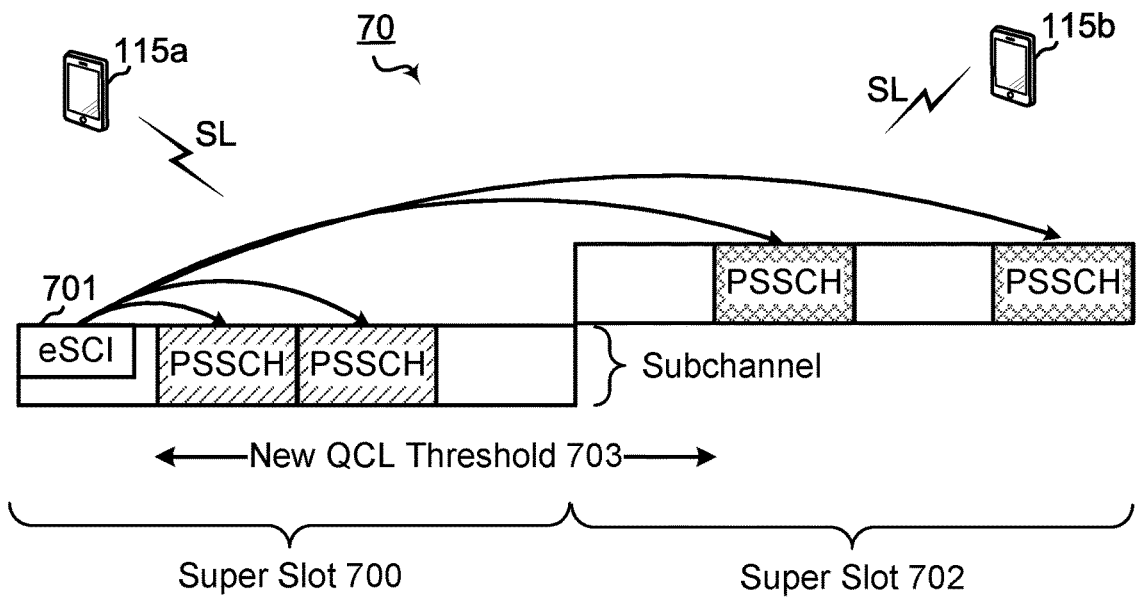
FIG. 7 is a block diagram illustrating a UE within a wireless network configured to provide super slot configuration for NR sidelink over mmW operating frequencies according to one or more aspects of the present disclosure.

FIG. 7 is a block diagram illustrating a UE 115a within a wireless network 70 configured to provide super slot configuration for NR sidelink over mmW operating frequencies according to one or more aspects of the present disclosure. As illustrated in FIGS. 5-6, UE 115a may conduct sidelink transmissions to various network entities, such as UE 115b. According to the aspects described herein, UE 115a, may operate with a sidelink resource pool configured with super slots of multiple contiguous slots for resource allocation. UE 115a configures the sidelink resource pool with super slots 700 and 702.

As noted above, the selection of resource slots, which are indicated in an eSCI, such as eSCI 701, as occupied in the current super slot or reserved in subsequent super slots, may be indicated with different beam directions (e.g., QCLs). According to the illustrated aspect, the resource pool further specify a default number of slots between which eSCI 701 can dynamically indicate a different QCL or beam direction to use for transmit beam(s) from those used in transmitting eSCI 701. This default number of slots satisfies a predetermined time duration for a beam direction switch. This default number of slots can be used for broadcast and groupcast communications. The default number of slots for the predetermined time duration for a beam direction switch may depend on the processing capability of the intended receiver. Therefore, when UE 115a transmits towards UE 115b as a unicast partner, eSCI 701 can include a different QCL according to the communication of capabilities in establishing the unicast connection. Such reserved resources with the different QCL may be selected according to a predetermined time duration for a beam direction switch that is dedicated to receive UEs, such as UE 115b.

Figure 8:
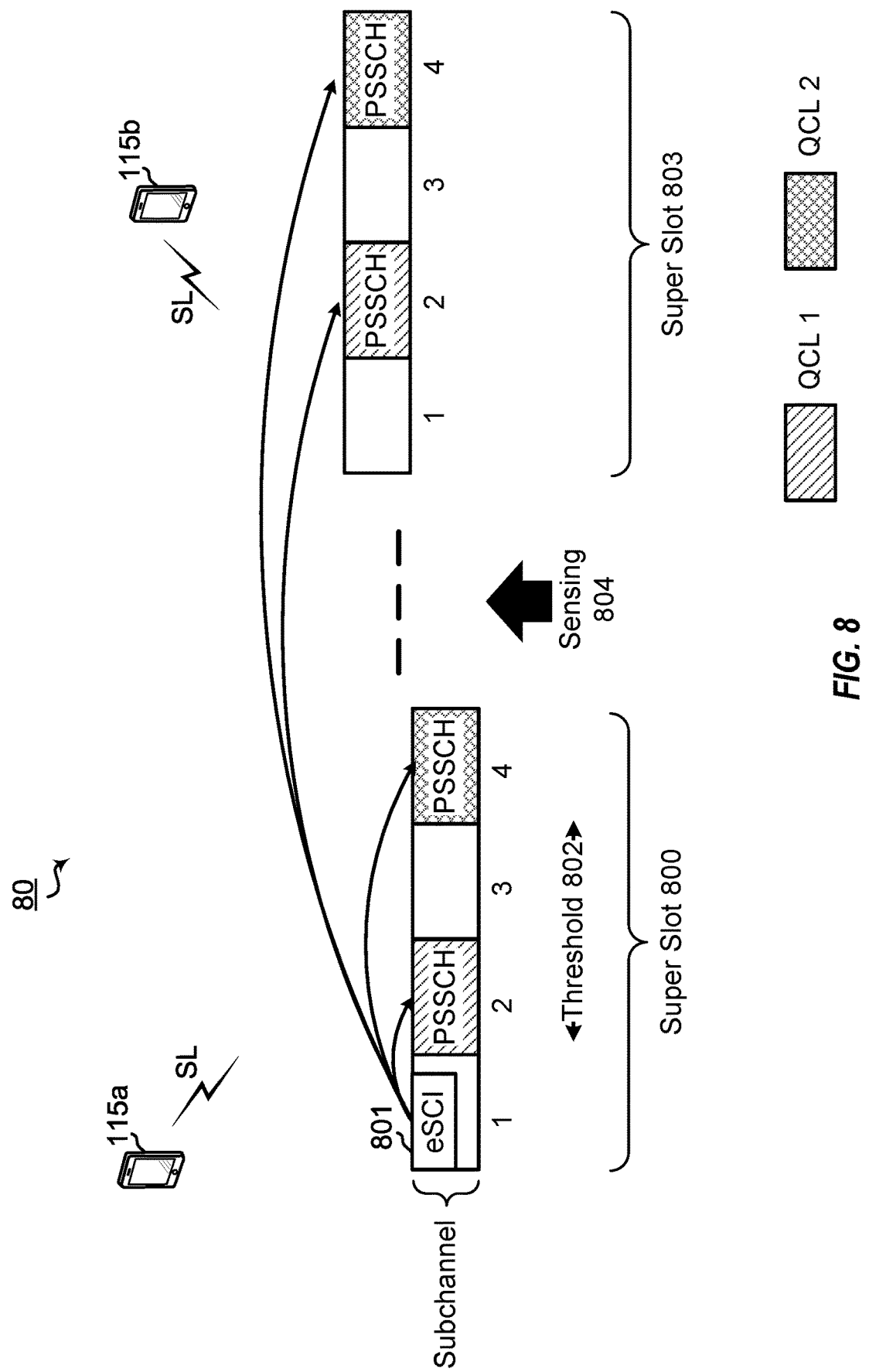
FIG. 8 is a block diagram illustrating a UE within a wireless network configured to provide super slot configuration for NR sidelink over mmW operating frequencies according to one or more aspects of the present disclosure.

FIG. 8 is a block diagram illustrating a UE 115a within a wireless network 80 configured to provide super slot configuration for NR sidelink over mmW operating frequencies according to one or more aspects of the present disclosure. As illustrated in FIGS. 5-7, UE 115a may conduct sidelink transmissions to various network entities, such as UE 115b. According to the aspects described herein, UE 115a, may operate with a sidelink resource pool configured with super slots of multiple contiguous slots for resource allocation. UE 115a configures the sidelink resource pool with super slots 800 and 803. eSCI 801 may include a QCL designation for each scheduled slot, either for the same-super slot occupancy, super slot 800, or a cross-super slot reservation, super slot 803, in a different subchannel than super slot 800.

For any given QCL reservation in a future super slot, such as super slot 803, a UE sensing during sensing period 804, such as UEs 115a and 115b, can predict its interference by measuring interference (e.g., via reference signal receive power (RSRP) or the like) on the PSSCH demodulation reference signal (DMRS) over the slot or slots having the same QCL designation scheduled by eSCI 801. In the illustrated aspect, eSCI 801 indicates occupation of slots 2 and 4 of super slot 800, in which the occupied resource of slot 2 is designated with QCL 1 and the occupied resource of slot 4 is designated with QCL 2. According to the predetermined time duration for a beam direction switch threshold 802 reflects the default number of slots allowed between different beam directions. eSCI 801 further indicates reservation of slots 2 and 4 of the future super slot, super slot 803, in which slot 2 is designated with QCI 1 and slot 4 is designated at QCL 2. A UE, such as UE 115b, operating in Mode 2 and sensing at sensing period 804 can measure the PSSCH DMRS at slots 2 and 4 of super slot 800 in order to predict the interference at slots 2 and 4 of super slot 803 designated with the same beam direction (QCL 1 and 2). This predicted interference level can then be used to determine whether those slots may be available.

Figure 9:
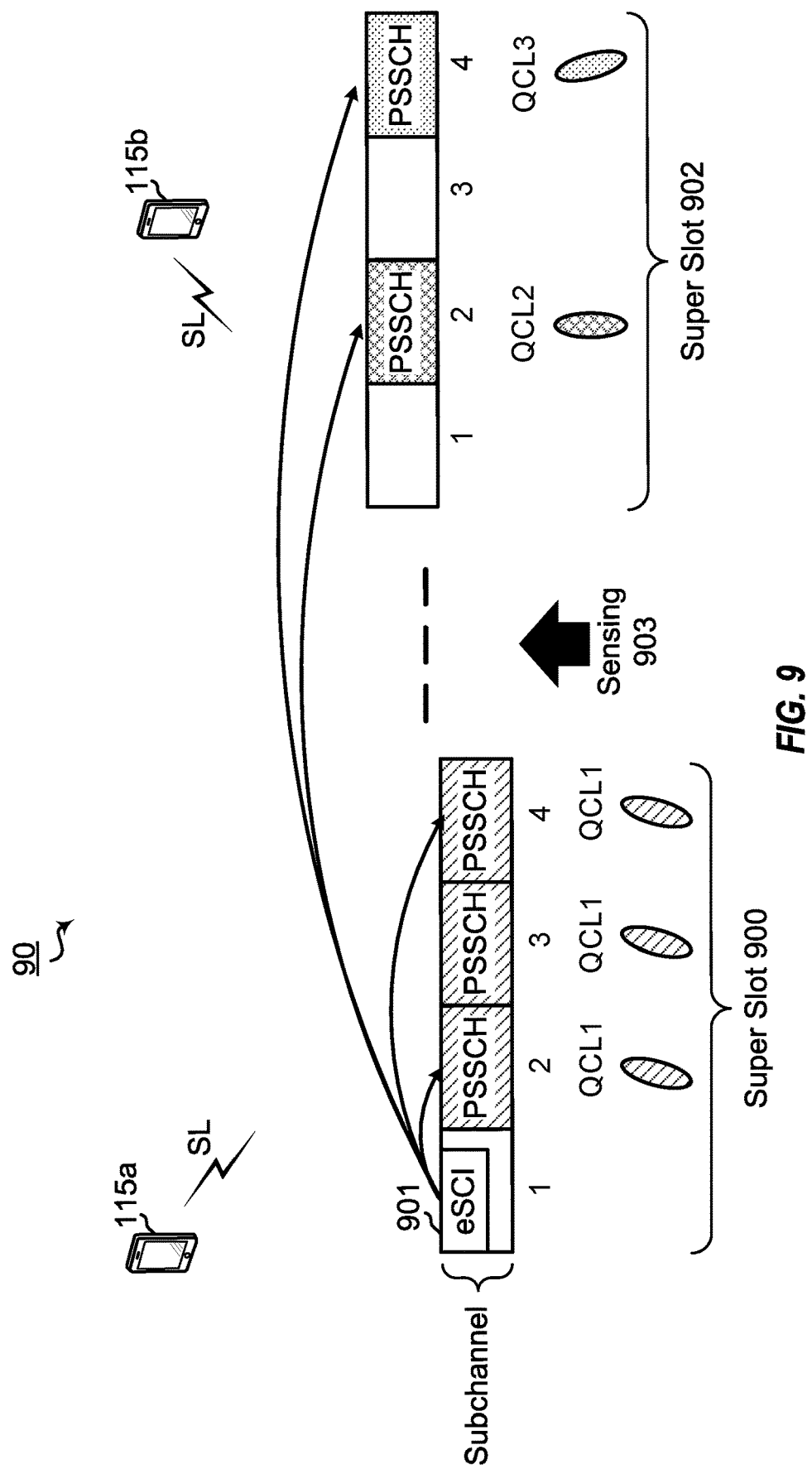
FIG. 9 is a block diagram illustrating a UE within a wireless network configured to provide super slot configuration for NR sidelink over mmW operating frequencies according to one or more aspects of the present disclosure.

FIG. 9 is a block diagram illustrating a UE 115a within a wireless network 90 configured to provide super slot configuration for NR sidelink over mmW operating frequencies according to one or more aspects of the present disclosure. As illustrated in FIGS. 5-8, UE 115a may conduct sidelink transmissions to various network entities, such as UE 115b. According to the aspects described herein, UE 115a, may operate with a sidelink resource pool configured with super slots of multiple contiguous slots for resource allocation. UE 115a configures the sidelink resource pool with super slots 900 and 902. When eSCI 901 makes a reservation of slots 2 and 4 in a future super slot, super slot 902, using a new QCL that is not used in the current super slot, super slot 900 (such as, due to the predetermined time duration for beam direction switch), it can specify a penalty to be applied during prediction of interference due to mismatched transmit beams.

In the illustrated aspect, eSCI 901 can indicate to apply a penalty (e.g., adding 10 dB, 20 dB, etc.) during prediction of interference from QCL 2 and 3 in super slot 902, when using the interference measurement on QCL 1 according to respective transmit beam disparities. The "distance" or difference between QCL 3 and QCL 1 may, intuitively, be larger than distance or difference between QCL2 and QCL1. In one example implementation, the sensing UE, such as UE 115b, may obtain a table of penalty values that correspond to the specific distances between various beam directions. UE 115b may obtain this penalty table either via layer 3 signaling or it may be hard-coded into the memory of UE 115b according to the sidelink wireless Specifications. eSCI 901 can include a bit index that corresponds to a penalty associated with the new or different QCL in the penalty table.

Figure 10:
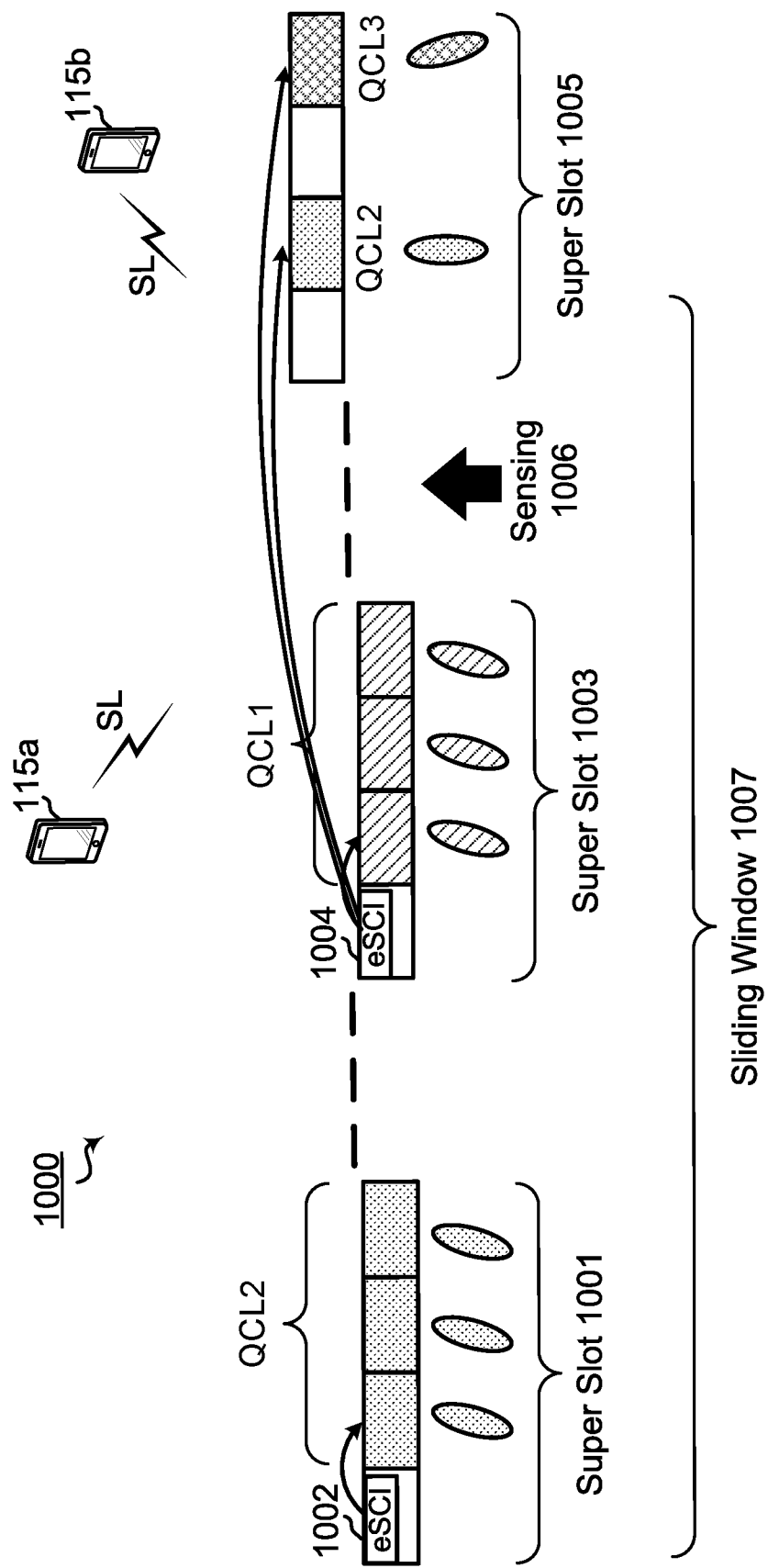
FIG. 10 is a block diagram illustrating a UE within a wireless network configured to provide super slot configuration for NR sidelink over mmW operating frequencies according to one or more aspects of the present disclosure.

FIG. 10 is a block diagram illustrating a UE 115a within a wireless network 1000 configured to provide super slot configuration for NR sidelink over mmW operating frequencies according to one or more aspects of the present disclosure. As illustrated in FIGS. 5-9, UE 115a may conduct sidelink transmissions to various network entities, such as UE 115b. According to the aspects described herein, UE 115a, may operate with a sidelink resource pool configured with super slots of multiple contiguous slots for resource allocation. UE 115a configures the sidelink resource pool with super slots 1001, 1003, and 1005. As an alternative to the penalty concept described with respect to FIG. 9, the sidelink resource pool can specify a default sliding window, sliding window 1007, during which a sensing UE, such as UE 115b, is allowed to use historical measurements to predict interference when a new QCL is reserved in a future super slot, such as super slot 1005, that has not shown up in any slot scheduled by eSCI 1004.

UE 115a transmits eSCI 1004 indicating occupation of slots within the current super slot, super slot 1003, designated at QCL 1 and reservation of two slots in a future super slot, super slot 1005, designated at QCL 2 and QCL 3, respectively. When a UE, such as UE 115b, is sensing during sensing period 1006, it cannot predict the availability of the QCL 2 slot or the QCL 3 slot based on any current slots, as all slots occupied in super slot 1003 are designed for QCL 1. However, according to the illustrated aspect, UE 115b may use sliding window 1007 to identify prior sensing occasions that may have sensed the same beam direction. As illustrated, UE 115b may predict interference on the QCL 2 slot in super slot 1005 based on measured interference of the QCL 2 transmissions in super slot 1001 identified by eSCI 1002. The sensing UE, UE 115b, can therefore use the interference measurements (e.g., DMRS RSRP) obtained from the QCL 2 transmissions of super slot 1001. In the illustrated aspect, the two eSCIs, eSCI 1002 and eSCI 1004, in super slot 1001 and super slot 1003, respectively, are transmitted by the same transmitting UE, UE 115a.

It should be noted that the resource pool can further specify a penalty, similar to the penalty described with respect to FIG. 9, for determining availability when using such historical measurements. This penalty value may depend on how "old" the measurement is, such that the older measurements may be penalized more than the more recent historical measurement.

It should further be noted that the sliding window, such as sliding window 1007 can be specifically dedicated to a particular unicast link to reflect the relative movement between the UEs, such as UE 115a and 115b.

Figure 11A:
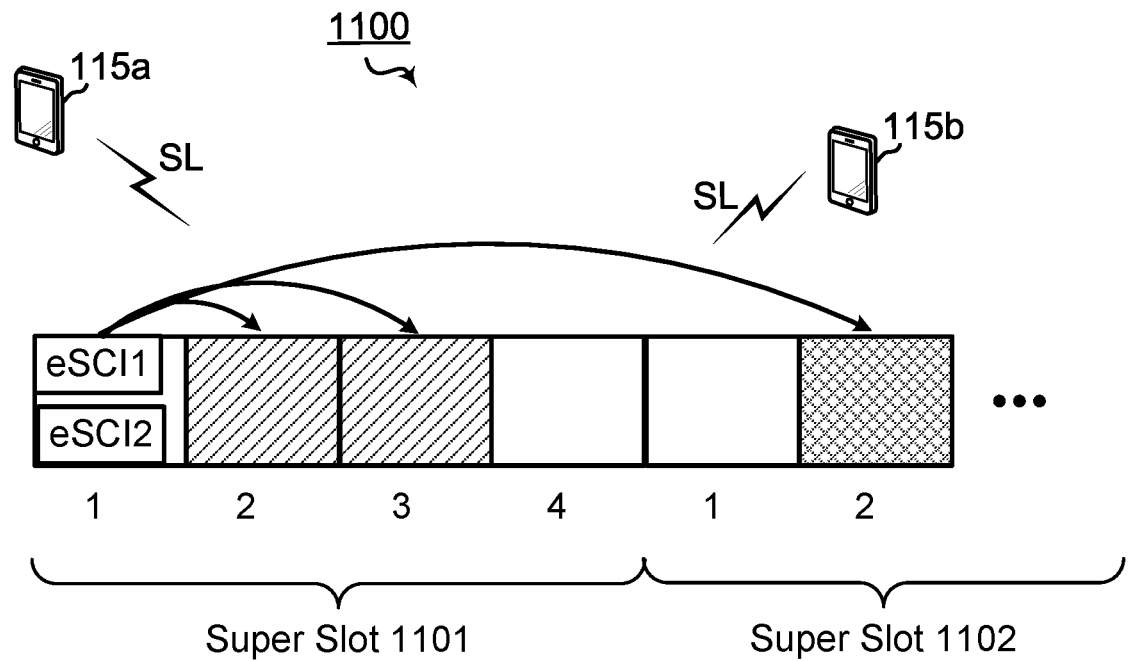
FIGS. 11A-11C are block diagrams illustrating a UE within wireless networks, respectively, configured to provide super slot configuration for NR sidelink over mmW operating frequencies according to one or more aspects of the present disclosure.
Figure 11B:
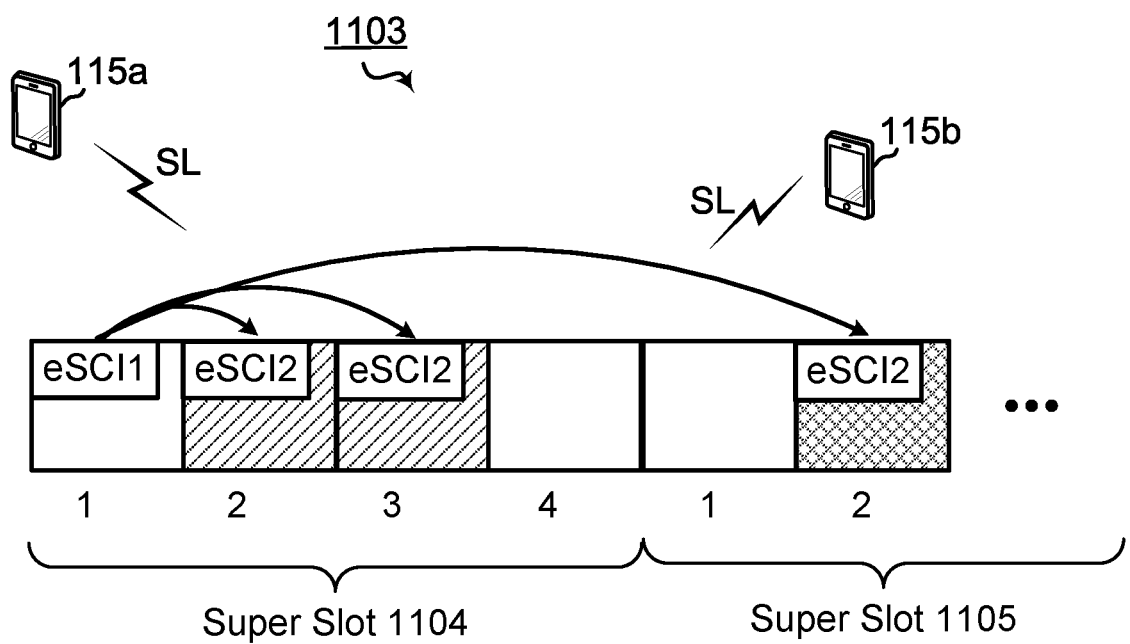
Figure 11C:
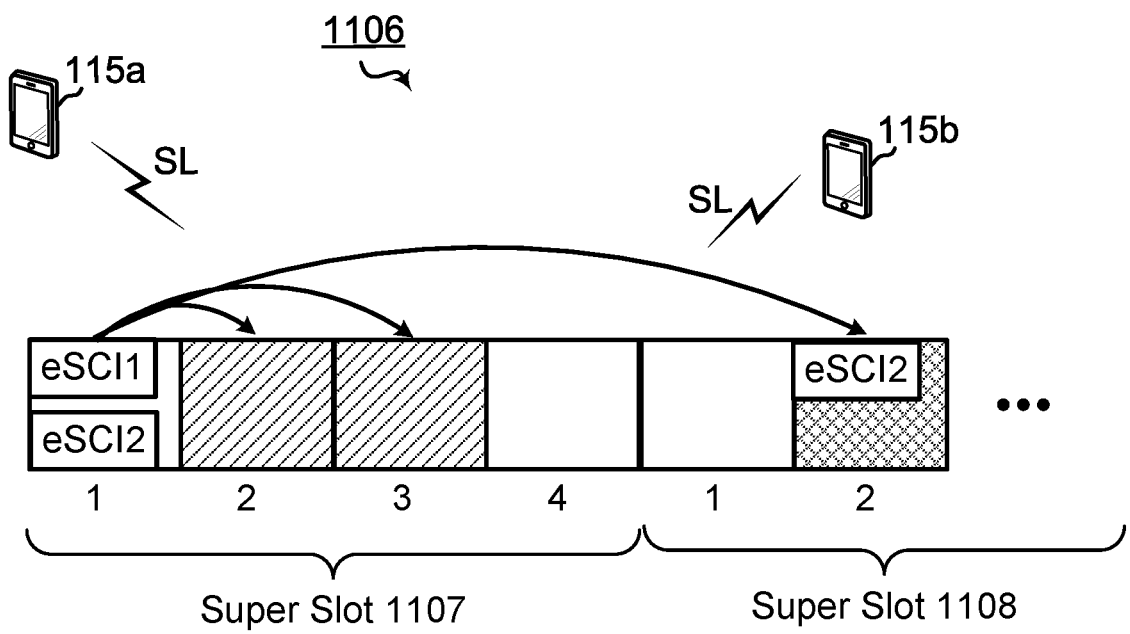

FIGS. 11A-11C are block diagrams illustrating a UE 115a within wireless networks 1100, 1103, and 1106, respectively, configured to provide super slot configuration for NR sidelink over mmW operating frequencies according to one or more aspects of the present disclosure. As illustrated in FIGS. 5-10, UE 115a may conduct sidelink transmissions to various network entities, such as UE 115b. According to the aspects described herein, UE 115a, may operate with a sidelink resource pool configured with super slots of multiple contiguous slots for resource allocation. UE 115a configures the sidelink resource pool with super slots 1101 and 1102 (FIG. 11A), 1104 and 1105 (FIG. 11B), and 1107 and 1108 (FIG. 11C).

The eSCI according to the aspects described herein can be configured according to the two-stage design provided in legacy sidelink communications. The eSCI configured according to the various described aspects in FIGS. 5-10, which indicate both same-super slot occupancy and cross-super slot reservation, can be carried in an enhanced PSCCH (ePSCCH). Such an ePSCCH can use the waveform of PSCCH (e.g., rank 1, polar-code, etc.). For a moderately-sized ePSCCH and higher control channel efficiency, more detailed control information for respective reserved slots or PSSCHs may include layer 1 source ID, layer 1 destination ID, requests for HARQ response, and the like. This enhanced control information can be separated out into one or more stage-two eSCIs and carried in the shared channel transmissions (e.g., PSSCHs). At a high level, stage-two eSCIs (eSCI-2) may be clustered (FIG. 11A), distributed (FIG. 11B), or mixed (FIG. 11C). In addition to carrying designation of QCLs, ePSCCH may carry parameters, such as MCS, number of layers, and the like, to provide information on how to explicitly decode respective the eSCI-2s.

In FIG. 11A, UE 115a transmits eSCI-1, which identifies occupation of slots 2 and 3 in super slot 1101 and identifies reservation of slot 2 of super slot 1102 designated at a different QCL. UE 115a may further transmit eSCI-2 in a clustered manner with eSCI-1 in slot 1 of super slot 1101. In FIG. 11B, UE 115a transmits eSCI-1 in slot 1 of super slot 1104, which identifies occupation of slots 2 and 3 in super slot 1104 and reservation of slot 2 in super slot 1105 designated at a different QCL. UE 115a distributes transmission of eSCI-2 in each selected or reserved slot, slots 2 and 3 in super slot 1104 and slot 2 in super slot 1105. In FIG. 11C, UE 115a transmits eSCI-1 in slot 1 of super slot 1107, which identifies occupation of slots 2 and 3 of super slot 1107 and reservation of slot 2 in super slot 1108 designated at a different QCL. UE 115 transmits an eSCI-2 clustered with eSCI-1 in slot 1 of super slot 1107 and an eSCI-2 distributed to the reserved slot 2 in super slot 1108.

Figure 12:
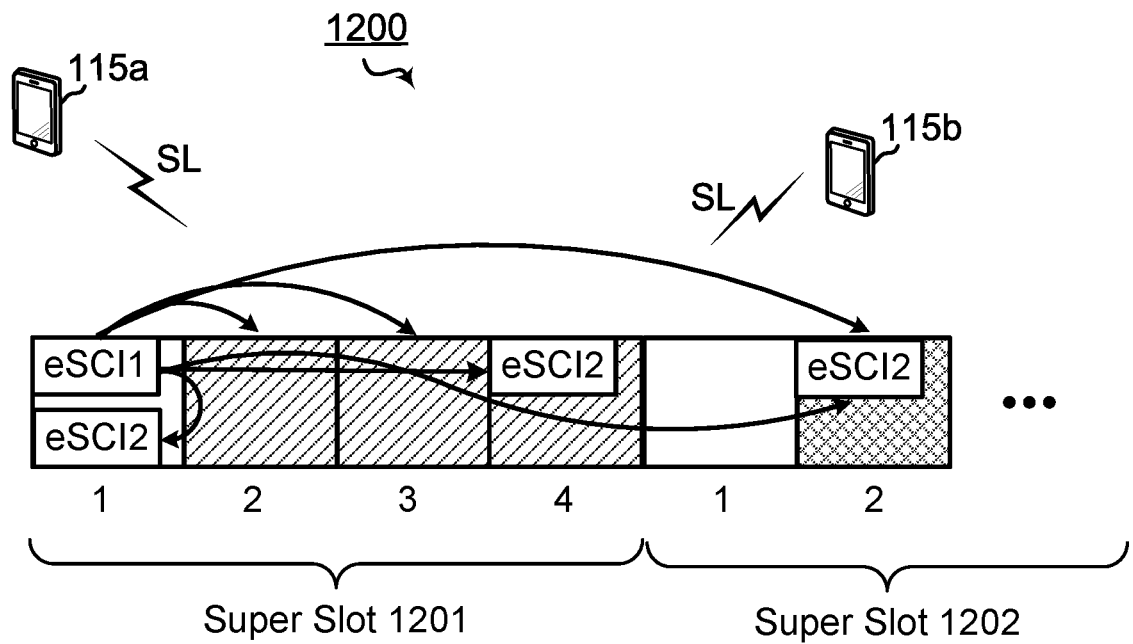
FIG. 12 is a block diagram illustrating a UE within a wireless network configured to provide super slot configuration for NR sidelink over mmW operating frequencies according to one or more aspects of the present disclosure.

FIG. 12 is a block diagram illustrating a UE 115a within a wireless network 1200 configured to provide super slot configuration for NR sidelink over mmW operating frequencies according to one or more aspects of the present disclosure. As illustrated in FIGS. 5-11C, UE 115a may conduct sidelink transmissions to various network entities, such as UE 115b. According to the aspects described herein, UE 115a, may operate with a sidelink resource pool configured with super slots of multiple contiguous slots for resource allocation. UE 115a configures the sidelink resource pool with super slots 1201 and 1202. UE 115a transmits eSCI-1 in slot 1 of super slot 1201, which identifies occupation of slots 2-4 of super slot 1201 and reserves slot 2 of super slot 1202 designated at a different QCL than that of the occupied slots 2-4. UE 115a transmits multiple eSCI-2s in a mixed clustered and distributed configuration. An eSCI-2 is clustered with eSCI-1 in slot 1 of super slot 1201, an eSCI-2 is distributed in slot 4 of super slot 1201, and distributed in slot 2 of super slot 1202.

Clustering eSCI-2s in the leading slot of a super slot, such as slot 1 in super slot 1201, may have the advantage of smaller control overhead due to the correlation of control information. For example, the clustered eSCIs may have the same source/destination IDs, same MCS, and a single cyclic redundancy check (CRC), as well as a longer micro-sleep for non-targeted RX UEs. The distributed eSCI-2, such as the eSCI-2 in slot 4 of super slot 1201 and slot 2 of super slot 1202, may exploit more efficient transmission formats towards respective destinations. In the illustrated aspect, eSCI-1 schedules four slots. Slot 2 of super slot 1202 is designated with a different QCL (e.g., a narrower beam, a different beam direction, and the like) and may benefit from a distributed eSCI-2 for providing additional control information specifically for the different QCL. Similarly, the transmission for slot 4 of super slot 1201 is intended for a closer target than the transmissions of slots 2 and 3 of super slot 1201.

It should be noted that the distribution of eSCI-2s may be determined based on various transmit characteristics to the destination UE or device. Transmit characteristics may include different QCLs, a distance of the destination from the transmitting UE, different environmental conditions, or the like.

Figure 13:
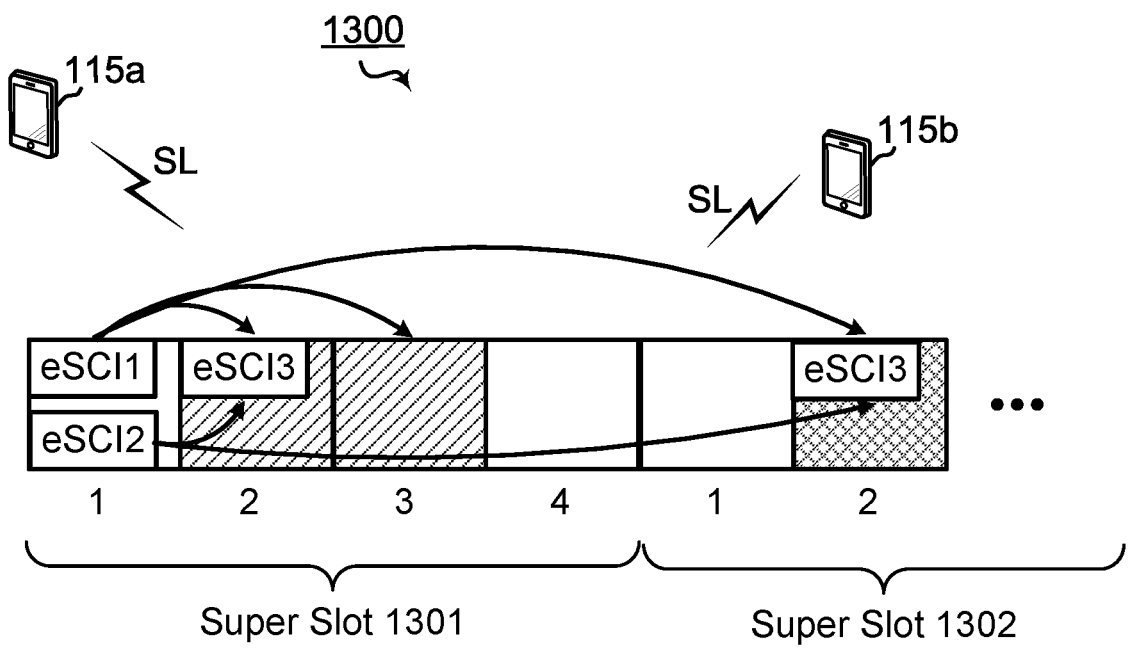
FIG. 13 is a block diagram illustrating a UE within a wireless network configured to provide super slot configuration for NR sidelink over mmW operating frequencies according to one or more aspects of the present disclosure.

FIG. 13 is a block diagram illustrating a UE 115a within a wireless network 1300 configured to provide super slot configuration for NR sidelink over mmW operating frequencies according to one or more aspects of the present disclosure. As illustrated in FIGS. 5-12, UE 115a may conduct sidelink transmissions to various network entities, such as UE 115b. According to the aspects described herein, UE 115a, may operate with a sidelink resource pool configured with super slots of multiple contiguous slots for resource allocation. UE 115a configures the sidelink resource pool with super slots 1301 and 1302. UE 115a transmits eSCI-1 in slot 1 of super slot 1301, which identifies occupation of slots 2 and 3 of super slot 1301 and reserves slot 2 of super slot 1302 designated at a different QCL than that of the occupied slots 2 and 3.

According to the illustrated aspect, the eSCI may be configured as a three-stage message. In the first stage eSCI, eSCI-1 transmitted in slot 1 of super slot 1301, the ePSCCH may carry the resource occupancy and reservation as described in the aspects of FIGS. 5-10, as well as the parameters used for decoding the PSSCH in the same slot, slot 1 of super slot 1301. Such a configuration of eSCI-1 can be helpful to preserve a constant size for the ePSCCH. The stage-two eSCI, eSCI-2, is clustered in slot 1 of super slot 1301 into the PSSCH sharing the slot with ePSCCH. eSCI-2 further identifies the stage-three eSCIs, eSCI-3s transmitted in slot 2 of super slot 1301 and slot 2 in super slot 1302 and carries information on which slots the eSCI-3s are located, as well as information for receiver UEs, such as UE 115b, to use to decode the eSCI-3s and the scheduled transmissions (e.g., PSSCH). eSCI-3s may also carry the layer 1 source ID, as well as all layer 1 destination IDs to facilitate longer micro-sleep for the untargeted UEs.

As illustrated, the eSCI-3s for the same destinations designated with the same QCL can be clustered together. Thus, eSCI-3 transmitted in slot 2 of super slot 1301 may apply to both transport blocks for slots 2 and 3 of super slot 1301 designated with the same QCL and eSCI-3 transmitted in slot 2 of super slot 1302 applies to the transport blocks of slot 2 designated at a different QCL.

Figure 14A:
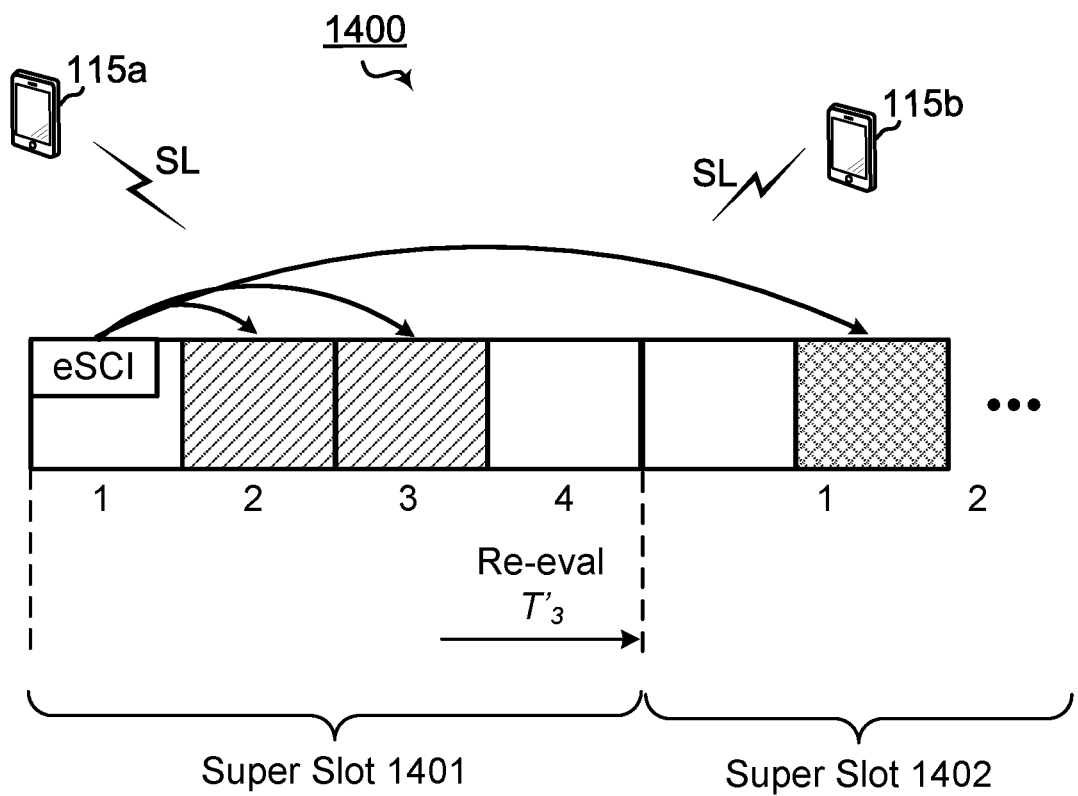
FIGS. 14A-14B are block diagrams illustrating a UE within wireless networks, respectively, configured to provide super slot configuration for NR sidelink over mmW operating frequencies according to one or more aspects of the present disclosure.
Figure 14B:
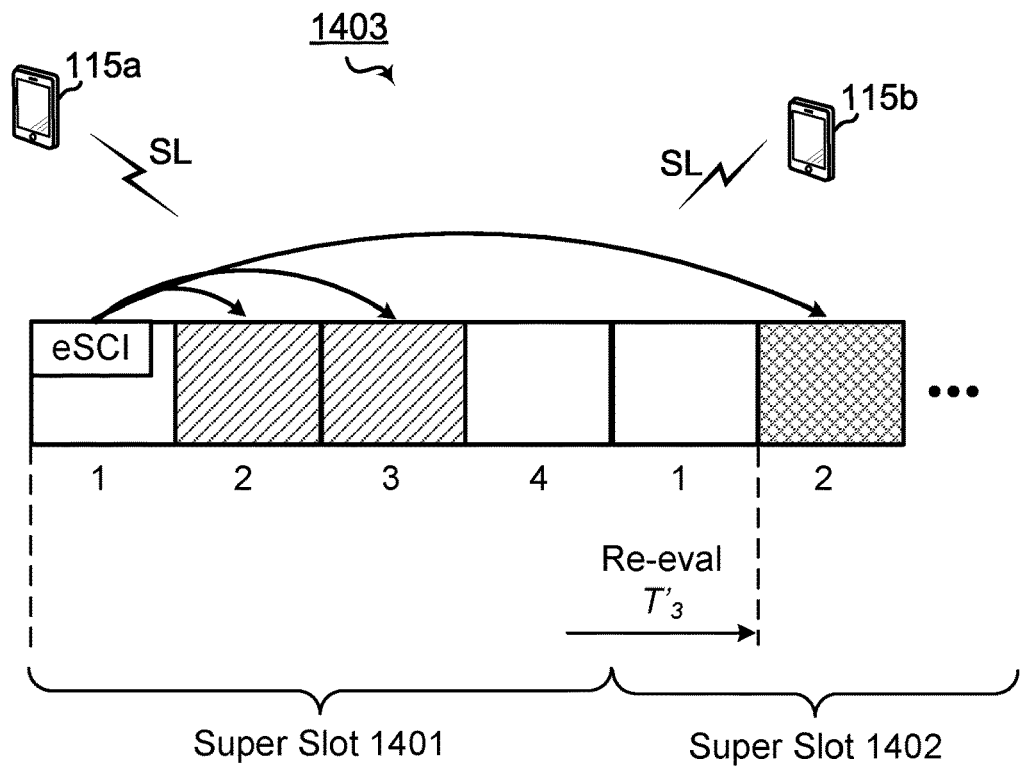

FIGS. 14A-14B are block diagrams illustrating a UE 115*a* within wireless networks 1400 and 1403, respectively, configured to provide super slot configuration for NR sidelink over mmW operating frequencies according to one or more aspects of the present disclosure. As illustrated in FIGS. 5-10, UE 115*a* may conduct sidelink transmissions to various network entities, such as UE 115*b*. According to the aspects described herein, UE 115*a*, may operate with a sidelink resource pool configured with super slots of multiple contiguous slots for resource allocation. UE 115*a* configures the sidelink resource pool with super slots 1401 and 1402. UE 115*a* transmits an eSCI in slot 1 of super slot 1401, which identifies occupation of slots 2 and 3 in super slot 1401 and reservation of slot 2 in super slot 1402.

According to the described aspects herein, UEs, such as UE 115*b*, sensing in Mode 2 may use the super slot, such as super slots 1401 and 1042, as the time-domain granularity and operate based upon decoded ePSCCHs for both initial sensing and re-evaluation sensing. For initial sensing by UE 115*b*, for example, the media access control (MAC) layer would send a sensing request for candidate super slots to the physical (PHY) layer, indicating the designated number contiguous slots per super slot. The PHY layer may then report the candidate super slots together with a bit-map indicating the respective available slots within the candidate super slot. The MAC layer may then randomly select an available super slot of the candidate super slots and marks the selected slots with the bitmap.

Re-evaluation sensing typically occurs at least $T_3$ ahead of the scheduled transmission. According to the aspects herein using super slot configurations, re-evaluation sensing may be implemented by at least two options. In a first optional implementation, illustrated in FIG. 14A, the re-evaluations occur at least $T_3$ ahead of the boundary of super slot 1401. In a second optional implementation, illustrated in FIG. 14B, the re-evaluations occur at least ahead of the first transmission slot, slot 2, of super slot 1402.

Figure 15A:
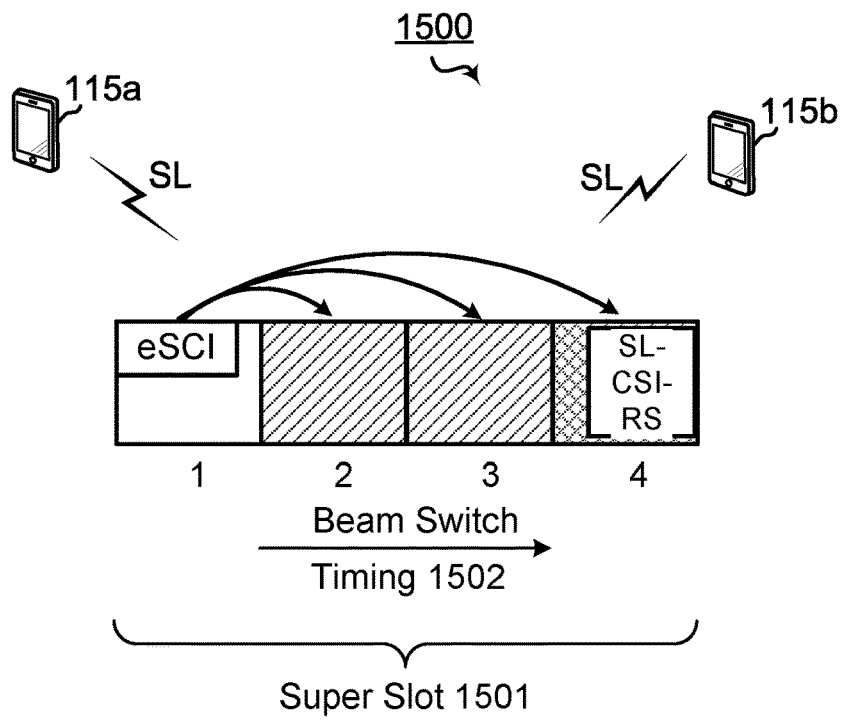
FIGS. 15A-15B are block diagrams illustrating a UE within wireless networks, respectively, configured to provide super slot configuration for NR sidelink over mmW operating frequencies according to one or more aspects of the present disclosure.
Figure 15B:
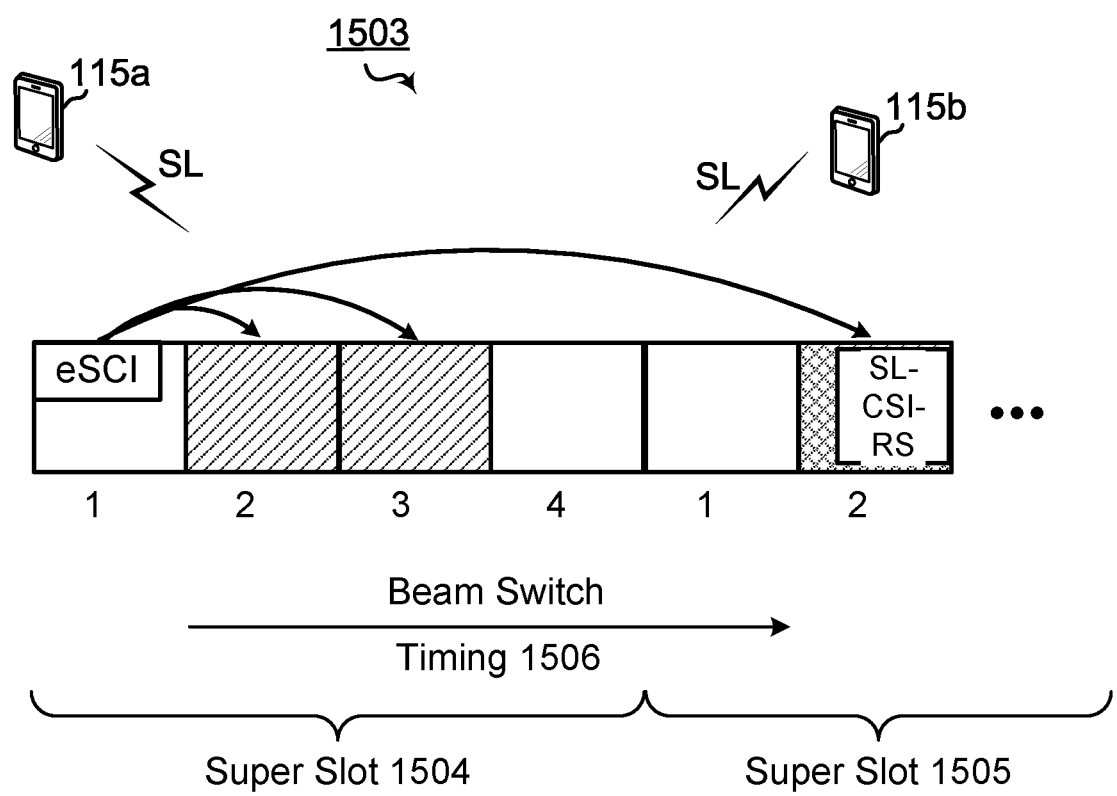

FIGS. 15A-15B are block diagrams illustrating a UE 115*a* within wireless networks 1500 and 1503, respectively, configured to provide super slot configuration for NR sidelink over mmW operating frequencies according to one or more aspects of the present disclosure. As illustrated in FIGS. 5-10, UE 115*a* may conduct sidelink transmissions to various network entities, such as UE 115*b*. According to the aspects described herein, UE 115*a*, may operate with a sidelink resource pool configured with super slots of multiple contiguous slots for resource allocation. In FIG. 15A, UE 115*a* configures the sidelink resource pool with super slot 1501 and transmits an eSCI in slot 1 of super slot 1501, which identifies occupation of slots 2 and 3 designated with a first QCL and slot 4 designated with a different QCL. In FIG. 15B, UE 115*a* configures the sidelink resource pool with super slots 1504 and 1505 and transmits an eSCI in slot 1 of super slot 1504, which identifies occupation of slots 2 and 3 in super slot 1504 and reservation of slot 2 in super slot 1505.

The eSCI can include a trigger for sidelink channel state information (SL-CSI) in accordance with a set of SL-CSI reference signals (SL-CSI-RS) to be inserted in a slot in the same or future super slot that satisfies the beam switch timing. In legal sidelink communication operations, the trigger and SL-CSI-RS are carried in the same slot. For the air interface, the beam switch timing describes the minimum duration between the end of the last symbol of the PDCCH containing the triggering DCI for aperiodic CSI-RS and the beginning of the first symbol of the CSI-RS transmission. A similar metric may be defined with respect to eSCI and SL-CSI-RS. The length of the beam switch timing may depend on the capabilities of the sidelink TX UE, such as UE 115*a*.

As illustrated in FIG. 15A, UE 115*a* has a beam switch timing 1502 that allows UE 115*a* to switch between the QCL designated for slots 2 and 3 and the QCL designated for slot 4 within super slot 1501. Thus, the trigger included in eSCI in slot 1 of super slot 1501 triggers SL-CSI-RS in slot 4 in super slot 1501. As illustrated in FIG. 15B, UE 115*a* is less capable with beam switch timing 1506. Thus, the trigger included in eSCI in slot 1 of super slot 1504 triggers SL-CSI-RS in slot 2 of super slot 1505.

It is noted that one or more blocks (or operations) described with reference to FIG. 4 may be combined with one or more blocks (or operations) described with reference to another of the figures. For example, one or more blocks (or operations) of FIG. 5 may be combined with one or more blocks (or operations) of FIG. 7. As another example, one or more blocks associated with FIG. 8 may be combined with one or more blocks associated with FIGS. 11A-11C. As another example, one or more blocks associated with FIG. 4 may be combined with one or more blocks (or operations) associated with FIGS. 1-2. Additionally, or alternatively, one or more operations described above with reference to FIGS. 1-2 may be combined with one or more operations described with reference to FIG. 16.

In one or more aspects, techniques for supporting relaxed sensing for NR sidelink over mmW operating frequencies may include additional aspects, such as any single aspect or any combination of aspects described below or in connection with one or more other processes or devices described elsewhere herein. In one or more aspects, supporting relaxed sensing for NR sidelink over mmW operating frequencies may include a UE configured to obtain a sidelink resource pool configuration including configuration of one or more super slots, wherein each super slot of the one or more super slots includes a plurality of slots contiguous in a time domain. The UE may select one or more sidelink resource slots for sidelink transmissions in a sidelink resource pool and transmit an eSCI message in a first slot of a first super slot of the one or more super slots identified by the UE for the sidelink transmissions, wherein the eSCI message indicates a reservation of slots corresponding to the one or more sidelink resource slots. The UE may then send the sidelink transmissions on at least one slot of the reservation of slots.

Additionally, the UE may perform or operate according to one or more aspects as described below. In some implementations, the UE may include at least one processor, and a memory coupled to the processor. The processor may be configured to perform operations described herein with respect to the apparatus. In some other implementations, the UE may include a non-transitory computer-readable medium having program code recorded thereon and the program code may be executable by a computer for causing the computer to perform operations described herein with reference to the apparatus. In some implementations, the UE may include one or more means configured to perform operations described herein. In some implementations, a method of wireless communication may include one or more operations described herein with reference to the UE.

The various aspects of the present disclosure may be implemented in many different ways, including methods, processes, non-transitory computer-readable medium having program code recorded thereon, apparatus having one or more processors with configurations and instructions for performing the described features and functionality, and the like. A first aspect configured for wireless communication by a UE may include obtaining, by the UE, a sidelink resource pool configuration including configuration of one or more super slots, wherein each super slot of the one or more super slots includes a plurality of slots contiguous in a time domain; selecting, by the UE, one or more sidelink resource slots for sidelink transmissions in a sidelink resource pool; transmitting, by the UE, an eSCI message in a first slot of a first super slot of the one or more super slots identified by the UE for the sidelink transmissions, wherein the eSCI message indicates a reservation of slots corresponding to the one or more sidelink resource slots; and sending, by the UE, the sidelink transmissions on at least one slot of the reservation of slots.

In a second aspect, alone or in combination with the first aspect, wherein the reservation of slots includes one or more of: an indication of one or more slots within the first super slot; and an additional indication of one or more additional slots within one or more subsequent super slots of the one or more super slots after the first super slot.

In a third aspect, alone or in combination with one or more of the first aspect and the second aspect, wherein the indication of the one or more slots includes a first bitmap identifying the one or more slots of the plurality of slots of the first super slot, and wherein the additional indication of the one or more additional slots includes an additional bitmap identifying the one or more additional slots of the plurality of slots of the one or more subsequent super slots.

In a fourth aspect, alone or in combination with one or more of the first through the third aspect, wherein the additional indication of the one or more additional slots is encoded using an initial vector according to a timing of the one or more super slots.

In a fifth aspect, alone or in combination with one or more of the first through the fourth aspect, wherein the sidelink resource pool configuration further includes a predetermined number of slots to separate the selecting of a first sidelink resource slot of the one or more sidelink resource slots for the sidelink transmissions using a first transmit beam direction and a first sidelink resource slot of the one or more sidelink resource slots for the sidelink transmissions using a different transmit beam direction.

In a sixth aspect, alone or in combination with one or more of the first through the fifth aspect, wherein the eSCI message further indicates a transmit beam direction for each reserved slot of the reservation of slots.

In a seventh aspect, alone or in combination with one or more of the first through the sixth aspect, wherein the eSCI message further includes an interference penalty indication identifying an interference penalty for use when predicting interference on the one or more additional slots indicated for the transmit beam direction different than the transmit beam direction indicated for the one or more slots.

In an eighth aspect, alone or in combination with one or more of the first through the seventh aspect, wherein the interference penalty indication includes one of: an indication of the interference penalty; or a bit indicator identifying the transmit beam direction, wherein the bit indicator further identifies the interference penalty in a table of interference penalties.

In a ninth aspect, alone or in combination with one or more of the first through the eighth aspect, wherein the eSCI message further includes an indication of a default sliding interference window of historic sensing occasions for prediction of availability of the one or more additional slots indicated for the transmit beam direction different than the transmit beam direction indicated for the one or more slots.

In a tenth aspect, alone or in combination with one or more of the first through the ninth aspect, wherein the eSCI message includes a first stage eSCI message transmitted in the first slot of the first super slot and one or more second stage eSCI messages transmitted in one or more of the one or more slots and the one or more additional slots.

In an eleventh aspect, alone or in combination with one or more of the first through the tenth aspect, further including: distributing, by the UE, the one or more second stage eSCI messages to the one or more of the one or more slots and the one or more additional slots according to a transmit characteristic of a transmissions destination of the sidelink transmissions.

In a twelfth aspect, alone or in combination with one or more of the first through the eleventh aspect, wherein the eSCI message includes: a first stage eSCI message transmitted in the first slot of the first super slot, wherein the first stage eSCI message includes the reservation of slots and first super slot decoding information for the sidelink transmissions in the first super slot, a second stage eSCI message transmitted in the first slot of the first super slot, wherein the second stage eSCI message includes third stage eSCI decoding information and identification of one or more third stage eSCI messages in one or more of a second or later slot of the one or more slots and the one or more additional slots, and wherein the one or more third stage eSCI messages include third stage decoding information for the sidelink transmissions in a super slot within which the one or more third stage eSCI messages are transmitted.

In a thirteenth aspect, alone or in combination with one or more of the first through the twelfth aspect, further including: sensing, by the UE, of the one or more super slots; and identifying, by the UE, one or more candidate super slots of the one or more super slots and one or more available slots in each candidate super slot of the one or more candidate super slots, wherein the one or more sidelink resource slots are selected from the one or more available slots in one or more selected super slots of the one or more candidate super slots.

In a fourteenth aspect, alone or in combination with one or more of the first through the thirteenth aspect, further including: sensing, by the UE, to reevaluate a first transmission slot of the one or more sidelink resource slots, wherein the sensing is conducted up to a predetermined time window prior to one of an ending boundary of a current super slot or the first transmission slot.

In a fifteenth aspect, alone or in combination with one or more of the first through the fourteenth aspect, further including: transmitting, by the UE, a set of sidelink CSI-RS in a slot of one of the first super slot or a subsequent super slot of the one or more subsequent super slots according to a predetermined beam switching duration from the eSCI message to the slot, wherein the set of sidelink CSI-RS are transmitted in response to a sidelink CSI trigger signal included in the eSCI message.

A sixteenth aspect configured for wireless communication includes a UE having at least one processor; and a memory coupled to the at least one processor, wherein the at least one processor is configured: to obtain, by the UE, a sidelink resource pool configuration including configuration of one or more super slots, wherein each super slot of the one or more super slots includes a plurality of slots contiguous in a time domain; to select, by the UE, one or more sidelink resource slots for sidelink transmissions in a sidelink resource pool; to transmit, by the UE, an eSCI message in a first slot of a first super slot of the one or more super slots identified by the UE for the sidelink transmissions, wherein the eSCI message indicates a reservation of slots corresponding to the one or more sidelink resource slots; and to send, by the UE, the sidelink transmissions on at least one slot of the reservation of slots.

In a seventeenth aspect, alone or in combination with the sixteenth aspect, wherein the reservation of slots includes one or more of: an indication of one or more slots within the first super slot; and an additional indication of one or more additional slots within one or more subsequent super slots of the one or more super slots after the first super slot.

In an eighteenth aspect, alone or in combination with one or more of the sixteenth aspect and the seventeenth aspect, wherein the indication of the one or more slots includes a first bitmap identifying the one or more slots of the plurality of slots of the first super slot, and wherein the additional indication of the one or more additional slots includes an additional bitmap identifying the one or more additional slots of the plurality of slots of the one or more subsequent super slots.

In a nineteenth aspect, alone or in combination with one or more of the sixteenth aspect through the eighteenth aspect, wherein the additional indication of the one or more additional slots is encoded using an initial vector according to a timing of the one or more super slots.

In a twentieth aspect, alone or in combination with one or more of the sixteenth aspect through the nineteenth aspect, wherein the sidelink resource pool configuration further includes a predetermined number of slots to separate the selecting of a first sidelink resource slot of the one or more sidelink resource slots for the sidelink transmissions using a first transmit beam direction and a first sidelink resource slot of the one or more sidelink resource slots for the sidelink transmissions using a different transmit beam direction.

In a twenty-first aspect, alone or in combination with one or more of the sixteenth aspect through the twentieth aspect, wherein the eSCI message further indicates a transmit beam direction for each reserved slot of the reservation of slots.

In a twenty-second aspect, alone or in combination with one or more of the sixteenth aspect through the twenty-first aspect, wherein the eSCI message further includes an interference penalty indication identifying an interference penalty for use when predicting interference on the one or more additional slots indicated for the transmit beam direction different than the transmit beam direction indicated for the one or more slots.

In a twenty-third aspect, alone or in combination with one or more of the sixteenth aspect through the twenty-second aspect, wherein the interference penalty indication includes one of: an indication of the interference penalty; or a bit indicator identifying the transmit beam direction, wherein the bit indicator further identifies the interference penalty in a table of interference penalties.

In a twenty-fourth aspect, alone or in combination with one or more of the sixteenth aspect through the twenty-third aspect, wherein the eSCI message further includes an indication of a default sliding interference window of historic sensing occasions for prediction of availability of the one or more additional slots indicated for the transmit beam direction different than the transmit beam direction indicated for the one or more slots.

In a twenty-fifth aspect, alone or in combination with one or more of the sixteenth aspect through the twenty-fourth aspect, wherein the eSCI message includes a first stage eSCI message transmitted in the first slot of the first super slot and one or more second stage eSCI messages transmitted in one or more of the one or more slots and the one or more additional slots.

In a twenty-sixth aspect, alone or in combination with one or more of the sixteenth aspect through the twenty-fifth aspect, further including configuration of the at least one processor: to distribute, by the UE, the one or more second stage eSCI messages to the one or more of the one or more slots and the one or more additional slots according to a transmit characteristic of a transmissions destination of the sidelink transmissions.

In a twenty-seventh aspect, alone or in combination with one or more of the sixteenth aspect through the twenty-sixth aspect, wherein the eSCI message includes: a first stage eSCI message transmitted in the first slot of the first super slot, wherein the first stage eSCI message includes the reservation of slots and first super slot decoding information for the sidelink transmissions in the first super slot, a second stage eSCI message transmitted in the first slot of the first super slot, wherein the second stage eSCI message includes third stage eSCI decoding information and identification of one or more third stage eSCI messages in one or more of a second or later slot of the one or more slots and the one or more additional slots, and wherein the one or more third stage eSCI messages include third stage decoding information for the sidelink transmissions in a super slot within which the one or more third stage eSCI messages are transmitted.

In a twenty-eighth aspect, alone or in combination with one or more of the sixteenth aspect through the twenty-seventh aspect, further including configuration of the at least one processor: to sense, by the UE, of the one or more super slots; and to identify, by the UE, one or more candidate super slots of the one or more super slots and one or more available slots in each candidate super slot of the one or more candidate super slots, wherein the one or more sidelink resource slots are selected from the one or more available slots in one or more selected super slots of the one or more candidate super slots.

In a twenty-ninth aspect, alone or in combination with one or more of the sixteenth aspect through the twenty-eighth aspect, further including configuration of the at least one processor: to sense, by the UE, to reevaluate a first transmission slot of the one or more sidelink resource slots, wherein the configuration of the at least one processor to sense is conducted up to a predetermined time window prior to one of an ending boundary of a current super slot or the first transmission slot.

In a thirtieth aspect, alone or in combination with one or more of the sixteenth aspect through the twenty-ninth aspect, further including configuration of the at least one processor: to transmit, by the UE, a set of sidelink CSI-RS in a slot of one of the first super slot or a subsequent super slot of the one or more subsequent super slots according to a predetermined beam switching duration from the eSCI message to the slot, wherein the set of sidelink CSI-RS are transmitted in response to a sidelink CSI trigger signal included in the eSCI message.

A thirty-first aspect configured for wireless communication of a UE includes means for obtaining, by the UE, a sidelink resource pool configuration including configuration of one or more super slots, wherein each super slot of the one or more super slots includes a plurality of slots contiguous in a time domain; means for selecting, by the UE, one or more sidelink resource slots for sidelink transmissions in a sidelink resource pool; means for transmitting, by the UE, an eSCI message in a first slot of a first super slot of the one or more super slots identified by the UE for the sidelink transmissions, wherein the eSCI message indicates a reservation of slots corresponding to the one or more sidelink resource slots; and means for sending, by the UE, the sidelink transmissions on at least one slot of the reservation of slots.

In a thirty-second aspect, alone or in combination with the thirty-first aspect, wherein the reservation of slots includes one or more of: an indication of one or more slots within the first super slot; and an additional indication of one or more additional slots within one or more subsequent super slots of the one or more super slots after the first super slot.

In a thirty-third aspect, alone or in combination with one or more of the thirty-first aspect or the thirty-second aspect, wherein the indication of the one or more slots includes a first bitmap identifying the one or more slots of the plurality of slots of the first super slot, and wherein the additional indication of the one or more additional slots includes an additional bitmap identifying the one or more additional slots of the plurality of slots of the one or more subsequent super slots.

In a thirty-fourth aspect, alone or in combination with one or more of the thirty-first aspect through the thirty-third aspect, wherein the additional indication of the one or more additional slots is encoded using an initial vector according to a timing of the one or more super slots.

In a thirty-fifth aspect, alone or in combination with one or more of the thirty-first aspect through the thirty-fourth aspect, wherein the sidelink resource pool configuration further includes a predetermined number of slots to separate the selecting of a first sidelink resource slot of the one or more sidelink resource slots for the sidelink transmissions using a first transmit beam direction and a first sidelink resource slot of the one or more sidelink resource slots for the sidelink transmissions using a different transmit beam direction.

In a thirty-sixth aspect, alone or in combination with one or more of the thirty-first aspect through the thirty-fifth aspect, wherein the eSCI message further indicates a transmit beam direction for each reserved slot of the reservation of slots.

In a thirty-seventh aspect, alone or in combination with one or more of the thirty-first aspect through the thirty-sixth aspect, wherein the eSCI message further includes an interference penalty indication identifying an interference penalty for use when predicting interference on the one or more additional slots indicated for the transmit beam direction different than the transmit beam direction indicated for the one or more slots.

In a thirty-eighth aspect, alone or in combination with one or more of the thirty-first aspect through the thirty-seventh aspect, wherein the interference penalty indication includes one of: an indication of the interference penalty; or a bit indicator identifying the transmit beam direction, wherein the bit indicator further identifies the interference penalty in a table of interference penalties.

In a thirty-ninth aspect, alone or in combination with one or more of the thirty-first aspect through the thirty-eighth aspect, wherein the eSCI message further includes an indication of a default sliding interference window of historic sensing occasions for prediction of availability of the one or more additional slots indicated for the transmit beam direction different than the transmit beam direction indicated for the one or more slots.

In a fortieth aspect, alone or in combination with one or more of the thirty-first aspect through the thirty-ninth aspect, wherein the eSCI message includes a first stage eSCI message transmitted in the first slot of the first super slot and one or more second stage eSCI messages transmitted in one or more of the one or more slots and the one or more additional slots.

In a forty-first aspect, alone or in combination with one or more of the thirty-first aspect through the fortieth aspect, further including: means for distributing, by the UE, the one or more second stage eSCI messages to the one or more of the one or more slots and the one or more additional slots according to a transmit characteristic of a transmissions destination of the sidelink transmissions.

In a forty-second aspect, alone or in combination with one or more of the thirty-first aspect through the forty-first aspect, wherein the eSCI message includes: a first stage eSCI message transmitted in the first slot of the first super slot, wherein the first stage eSCI message includes the reservation of slots and first super slot decoding information for the sidelink transmissions in the first super slot, a second stage eSCI message transmitted in the first slot of the first super slot, wherein the second stage eSCI message includes third stage eSCI decoding information and identification of one or more third stage eSCI messages in one or more of a second or later slot of the one or more slots and the one or more additional slots, and wherein the one or more third stage eSCI messages include third stage decoding information for the sidelink transmissions in a super slot within which the one or more third stage eSCI messages are transmitted.

In a forty-third aspect, alone or in combination with one or more of the thirty-first aspect through the forty-second aspect, further including: means for sensing, by the UE, of the one or more super slots; and means for identifying, by the UE, one or more candidate super slots of the one or more super slots and one or more available slots in each candidate super slot of the one or more candidate super slots, wherein the one or more sidelink resource slots are selected from the one or more available slots in one or more selected super slots of the one or more candidate super slots.

In a forty-fourth aspect, alone or in combination with one or more of the thirty-first aspect through the forty-third aspect, further including: means for sensing, by the UE, to reevaluate a first transmission slot of the one or more sidelink resource slots, wherein the means for sensing is conducted up to a predetermined time window prior to one of an ending boundary of a current super slot or the first transmission slot.

In a forty-fifth aspect, alone or in combination with one or more of the thirty-first aspect through the forty-fourth aspect, further including: means for transmitting, by the UE, a set of sidelink CSI-RS in a slot of one of the first super slot or a subsequent super slot of the one or more subsequent super slots according to a predetermined beam switching duration from the eSCI message to the slot, wherein the set of sidelink CSI-RS are transmitted in response to a sidelink CSI trigger signal included in the eSCI message.

A forty-sixth aspect includes a UE having a non-transitory computer-readable medium having program code recorded thereon. The program code may include program code executable by a computer for causing the computer to obtain, by the UE, a sidelink resource pool configuration including configuration of one or more super slots, wherein each super slot of the one or more super slots includes a plurality of slots contiguous in a time domain; program code executable by the computer for causing the computer to select, by the UE, one or more sidelink resource slots for sidelink transmissions in a sidelink resource pool; program code executable by the computer for causing the computer to transmit, by the UE, an eSCI message in a first slot of a first super slot of the one or more super slots identified by the UE for the sidelink transmissions, wherein the eSCI message indicates a reservation of slots corresponding to the one or more sidelink resource slots; and program code executable by the computer for causing the computer to send, by the UE, the sidelink transmissions on at least one slot of the reservation of slots.

In a forty-seventh aspect, alone or in combination with the forty-sixth aspect, wherein the reservation of slots includes one or more of: an indication of one or more slots within the first super slot; and an additional indication of one or more additional slots within one or more subsequent super slots of the one or more super slots after the first super slot.

In a forty-eighth aspect, alone or in combination with one or more of the forty-sixth aspect or the forty-seventh aspect, wherein the indication of the one or more slots includes a first bitmap identifying the one or more slots of the plurality of slots of the first super slot, and wherein the additional indication of the one or more additional slots includes an additional bitmap identifying the one or more additional slots of the plurality of slots of the one or more subsequent super slots.

In a forty-ninth aspect, alone or in combination with one or more of the forty-sixth aspect through the forty-eighth aspect, wherein the additional indication of the one or more additional slots is encoded using an initial vector according to a timing of the one or more super slots.

In a fiftieth aspect, alone or in combination with one or more of the forty-sixth aspect through the forty-ninth aspect, wherein the sidelink resource pool configuration further includes a predetermined number of slots to separate the selecting of a first sidelink resource slot of the one or more sidelink resource slots for the sidelink transmissions using a first transmit beam direction and a first sidelink resource slot of the one or more sidelink resource slots for the sidelink transmissions using a different transmit beam direction.

In a fifty-first aspect, alone or in combination with one or more of the forty-sixth aspect through the fiftieth aspect, wherein the eSCI message further indicates a transmit beam direction for each reserved slot of the reservation of slots.

In a fifty-second aspect, alone or in combination with one or more of the forty-sixth aspect through the fifty-first aspect, wherein the eSCI message further includes an interference penalty indication identifying an interference penalty for use when predicting interference on the one or more additional slots indicated for the transmit beam direction different than the transmit beam direction indicated for the one or more slots.

In a fifty-third aspect, alone or in combination with one or more of the forty-sixth aspect through the fifty-second aspect, wherein the interference penalty indication includes one of: an indication of the interference penalty; or a bit indicator identifying the transmit beam direction, wherein the bit indicator further identifies the interference penalty in a table of interference penalties.

In a fifty-fourth aspect, alone or in combination with one or more of the forty-sixth aspect through the fifty-third aspect, wherein the eSCI message further includes an indication of a default sliding interference window of historic sensing occasions for prediction of availability of the one or more additional slots indicated for the transmit beam direction different than the transmit beam direction indicated for the one or more slots.

In a fifty-fifth aspect, alone or in combination with one or more of the forty-sixth aspect through the fifty-fourth aspect, wherein the eSCI message includes a first stage eSCI message transmitted in the first slot of the first super slot and one or more second stage eSCI messages transmitted in one or more of the one or more slots and the one or more additional slots.

In a fifty-sixth aspect, alone or in combination with one or more of the forty-sixth aspect through the fifty-fifth aspect, further including program code executable by the computer for causing the computer to distribute, by the UE, the one or more second stage eSCI messages to the one or more of the one or more slots and the one or more additional slots according to a transmit characteristic of a transmissions destination of the sidelink transmissions.

In a fifty-seventh aspect, alone or in combination with one or more of the forty-sixth aspect through the fifty-sixth aspect, wherein the eSCI message includes: a first stage eSCI message transmitted in the first slot of the first super slot, wherein the first stage eSCI message includes the reservation of slots and first super slot decoding information for the sidelink transmissions in the first super slot, a second stage eSCI message transmitted in the first slot of the first super slot, wherein the second stage eSCI message includes third stage eSCI decoding information and identification of one or more third stage eSCI messages in one or more of a second or later slot of the one or more slots and the one or more additional slots, and wherein the one or more third stage eSCI messages include third stage decoding information for the sidelink transmissions in a super slot within which the one or more third stage eSCI messages are transmitted.

In a fifty-eighth aspect, alone or in combination with one or more of the forty-sixth aspect through the fifty-seventh aspect, further including program code executable by the computer for causing the computer: to sense, by the UE, of the one or more super slots; and to identify, by the UE, one or more candidate super slots of the one or more super slots and one or more available slots in each candidate super slot of the one or more candidate super slots, wherein the one or more sidelink resource slots are selected from the one or more available slots in one or more selected super slots of the one or more candidate super slots.

In a fifty-ninth aspect, alone or in combination with one or more of the forty-sixth aspect through the fifty-eighth aspect, further including program code executable by the computer for causing the computer to sense, by the UE, to reevaluate a first transmission slot of the one or more sidelink resource slots, wherein the program code executable by the computer for causing the computer to sense is executed up to a predetermined time window prior to one of an ending boundary of a current super slot or the first transmission slot.

In a sixtieth aspect, alone or in combination with one or more of the forty-sixth aspect through the fifty-ninth aspect, further including program code executable by the computer for causing the computer: to transmit, by the UE, a set of sidelink CSI-RS in a slot of one of the first super slot or a subsequent super slot of the one or more subsequent super slots according to a predetermined beam switching duration from the eSCI message to the slot, wherein the set of sidelink CSI-RS are transmitted in response to a sidelink CSI trigger signal included in the eSCI message.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-16 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:

obtaining, by the UE, a sidelink resource pool configuration including configuration of one or more super slots, wherein each super slot of the one or more super slots includes a plurality of slots contiguous in a time domain;

selecting, by the UE, one or more sidelink resource slots for sidelink transmissions in a sidelink resource pool;

transmitting, by the UE, an enhanced sidelink control information (eSCI) message in a first slot of a first super slot of the one or more super slots identified by the UE for the sidelink transmissions, wherein the eSCI message indicates a reservation of slots corresponding to the one or more sidelink resource slots; and sending, by the UE, the sidelink transmissions on at least one slot of the reservation of slots.

2. The method of claim 1, wherein the reservation of slots includes one or more of:

an indication of one or more slots within the first super slot; and an additional indication of one or more additional slots within one or more subsequent super slots of the one or more super slots after the first super slot.

3. The method of claim 2, wherein the indication of the one or more slots includes a first bitmap identifying the one or more slots of the plurality of slots of the first super slot, and wherein the additional indication of the one or more additional slots includes an additional bitmap identifying the one or more additional slots of the plurality of slots of the one or more subsequent super slots.

4. The method of claim 2, wherein the additional indication of the one or more additional slots is encoded using an initial vector according to a timing of the one or more super slots.

5. The method of claim 2, wherein the sidelink resource pool configuration further includes a predetermined number of slots to separate the selecting of a first sidelink resource slot of the one or more sidelink resource slots for the sidelink transmissions using a first transmit beam direction and a first sidelink resource slot of the one or more sidelink resource slots for the sidelink transmissions using a different transmit beam direction.

6. The method of claim 2, wherein the eSCI message further indicates a transmit beam direction for each reserved slot of the reservation of slots.

7. The method of claim 6, wherein the eSCI message further includes an interference penalty indication identifying an interference penalty for use when predicting interference on the one or more additional slots indicated for the transmit beam direction different than the transmit beam direction indicated for the one or more slots.

8. The method of claim 7, wherein the interference penalty indication includes one of:

an indication of the interference penalty; or a bit indicator identifying the transmit beam direction, wherein the bit indicator further identifies the interference penalty in a table of interference penalties.

9. The method of claim 6, wherein the eSCI message further includes an indication of a default sliding interference window of historic sensing occasions for prediction of availability of the one or more additional slots indicated for the transmit beam direction different than the transmit beam direction indicated for the one or more slots.

10. The method of claim 2, wherein the eSCI message includes a first stage eSCI message transmitted in the first slot of the first super slot and one or more second stage eSCI messages transmitted in one or more of the one or more slots and the one or more additional slots.

11. The method of claim 10, further including:
distributing, by the UE, the one or more second stage eSCI messages to the one or more of the one or more slots and the one or more additional slots according to a transmit characteristic of a transmissions destination of the sidelink transmissions.

12. The method of claim 2, wherein the eSCI message includes:
a first stage eSCI message transmitted in the first slot of the first super slot, wherein the first stage eSCI message includes the reservation of slots and first super slot decoding information for the sidelink transmissions in the first super slot,
a second stage eSCI message transmitted in the first slot of the first super slot, wherein the second stage eSCI message includes third stage eSCI decoding information and identification of one or more third stage eSCI messages in one or more of a second or later slot of the one or more slots and the one or more additional slots, and
wherein the one or more third stage eSCI messages include third stage decoding information for the sidelink transmissions in a super slot within which the one or more third stage eSCI messages are transmitted.

13. The method of claim 2, further including:
sensing, by the UE, of the one or more super slots; and
identifying, by the UE, one or more candidate super slots of the one or more super slots and one or more available slots in each candidate super slot of the one or more candidate super slots, wherein the one or more sidelink resource slots are selected from the one or more available slots in one or more selected super slots of the one or more candidate super slots.

14. The method of claim 13, further including:
sensing, by the UE, to reevaluate a first transmission slot of the one or more sidelink resource slots, wherein the sensing is conducted up to a predetermined time window prior to one of an ending boundary of a current super slot or the first transmission slot.

15. The method of claim 2, further including:
transmitting, by the UE, a set of sidelink channel state information (CSI) reference signals (CSI-RS) in a slot of one of the first super slot or a subsequent super slot of the one or more subsequent super slots according to a predetermined beam switching duration from the eSCI message to the slot,
wherein the set of sidelink CSI-RS are transmitted in response to a sidelink CSI trigger signal included in the eSCI message.

16. A user equipment (UE) configured for wireless communication, the UE comprising:
at least one processor; and
at least one memory coupled to the at least one processor, wherein the at least one processor is configured:
to obtain, by the UE, a sidelink resource pool configuration including configuration of one or more super slots, wherein each super slot of the one or more super slots includes a plurality of slots contiguous in a time domain;
to select, by the UE, one or more sidelink resource slots for sidelink transmissions in a sidelink resource pool;
to transmit, by the UE, an enhanced sidelink control information (eSCI) message in a first slot of a first super slot of the one or more super slots identified by the UE for the sidelink transmissions, wherein the eSCI message indicates a reservation of slots corresponding to the one or more sidelink resource slots; and
to send, by the UE, the sidelink transmissions on at least one slot of the reservation of slots.

17. The UE of claim 16, wherein the reservation of slots includes one or more of:
an indication of one or more slots within the first super slot; and
an additional indication of one or more additional slots within one or more subsequent super slots of the one or more super slots after the first super slot.

18. The UE of claim 17,
wherein the indication of the one or more slots includes a first bitmap identifying the one or more slots of the plurality of slots of the first super slot, and
wherein the additional indication of the one or more additional slots includes an additional bitmap identifying the one or more additional slots of the plurality of slots of the one or more subsequent super slots.

19. The UE of claim 17, wherein the additional indication of the one or more additional slots is encoded using an initial vector according to a timing of the one or more super slots.

20. The UE of claim 17, wherein the sidelink resource pool configuration further includes a predetermined number of slots to separate the selecting of a first sidelink resource slot of the one or more sidelink resource slots for the sidelink transmissions using a first transmit beam direction and a first sidelink resource slot of the one or more sidelink resource slots for the sidelink transmissions using a different transmit beam direction.

21. The UE of claim 17, wherein the eSCI message further indicates a transmit beam direction for each reserved slot of the reservation of slots.

22. The UE of claim 21, wherein the eSCI message further includes an interference penalty indication identifying an interference penalty for use when predicting interference on the one or more additional slots indicated for the transmit beam direction different than the transmit beam direction indicated for the one or more slots.

23. The UE of claim 22, wherein the interference penalty indication includes one of:
an indication of the interference penalty; or
a bit indicator identifying the transmit beam direction, wherein the bit indicator further identifies the interference penalty in a table of interference penalties.

24. The UE of claim 21, wherein the eSCI message further includes an indication of a default sliding interference window of historic sensing occasions for prediction of availability of the one or more additional slots indicated for the transmit beam direction different than the transmit beam direction indicated for the one or more slots.

25. The UE of claim 17, wherein the eSCI message includes a first stage eSCI message transmitted in the first slot of the first super slot and one or more second stage eSCI messages transmitted in one or more of the one or more slots and the one or more additional slots.

26. The UE of claim 25, further including configuration of the at least one processor:
to distribute, by the UE, the one or more second stage eSCI messages to the one or more of the one or more slots and the one or more additional slots according to a transmit characteristic of a transmissions destination of the sidelink transmissions.

27. The UE of claim 17, wherein the eSCI message includes:

a first stage eSCI message transmitted in the first slot of the first super slot, wherein the first stage eSCI message includes the reservation of slots and first super slot decoding information for the sidelink transmissions in the first super slot, a second stage eSCI message transmitted in the first slot of the first super slot, wherein the second stage eSCI message includes third stage eSCI decoding information and identification of one or more third stage eSCI messages in one or more of a second or later slot of the one or more slots and the one or more additional slots, and wherein the one or more third stage eSCI messages include third stage decoding information for the sidelink transmissions in a super slot within which the one or more third stage eSCI messages are transmitted.

28. The UE of claim 17, further including configuration of the at least one processor:
to sense, by the UE, of the one or more super slots; and
to identify, by the UE, one or more candidate super slots of the one or more super slots and one or more available slots in each candidate super slot of the one or more candidate super slots, wherein the one or more sidelink resource slots are selected from the one or more available slots in one or more selected super slots of the one or more candidate super slots.

29. The UE of claim 28, further including configuration of the at least one processor:
to sense, by the UE, to reevaluate a first transmission slot of the one or more sidelink resource slots, wherein the configuration of the at least one processor to sense is conducted up to a predetermined time window prior to one of an ending boundary of a current super slot or the first transmission slot.

30. The UE of claim 17, further including configuration of the at least one processor:
to transmit, by the UE, a set of sidelink channel state information (CSI) reference signals (CSI-RS) in a slot of one of the first super slot or a subsequent super slot of the one or more subsequent super slots according to a predetermined beam switching duration from the eSCI message to the slot,
wherein the set of sidelink CSI-RS are transmitted in response to a sidelink CSI trigger signal included in the eSCI message.

* * * * *